(12) United States Patent
Watanabe et al.

(10) Patent No.: US 7,396,600 B2
(45) Date of Patent: Jul. 8, 2008

(54) BATTERY PACK

(75) Inventors: Atsushi Watanabe, Tsuna-gun (JP);
Mikitaka Tamai, Tsuna-gun (JP);
Hiroki Teraoka, Sumoto (JP);
Masatsugu Naka, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 586 days.

(21) Appl. No.: 10/939,332

(22) Filed: Sep. 14, 2004

(65) Prior Publication Data

US 2005/0053827 A1  Mar. 10, 2005

(30) Foreign Application Priority Data

Sep. 16, 2003  (JP)  ............... 2003-323771

(51) Int. Cl.
*H01M 2/34* (2006.01)
(52) U.S. Cl. ............... 429/7; 429/61; 429/62
(58) Field of Classification Search ...... 429/7, 429/61, 62
See application file for complete search history.

(56) References Cited

U.S. PATENT DOCUMENTS

| | | | |
|---|---|---|---|
| 4,507,368 A | 3/1985 | Hashimoto | 429/62 |
| 6,403,250 B1 | 6/2002 | Azema et al. | 429/53 |
| 6,432,575 B1 | 8/2002 | Yamagami | 429/100 |
| 6,524,732 B1 * | 2/2003 | Iwaizono et al. | 429/7 |

FOREIGN PATENT DOCUMENTS

| | | |
|---|---|---|
| GB | 2 088 158 | 6/1982 |
| JP | 2000-243362 | 9/2000 |
| JP | 2003-315483 | 11/2000 |
| JP | 2003-31192 | 1/2003 |
| JP | 2003-132860 | 5/2003 |
| JP | 2003-132861 | 5/2003 |
| JP | 2003-162987 | 6/2003 |
| JP | 2003-229105 | 8/2003 |
| JP | 2003-242958 | 8/2003 |
| WO | 03/069697 | 8/2003 |

OTHER PUBLICATIONS

English translation of JP 2003-315,843 (Hirota) from the Japanese Patent Office website (doc date Nov. 2000).*

* cited by examiner

*Primary Examiner*—Stephen J. Kalafut
(74) *Attorney, Agent, or Firm*—Wenderoth, Lind & Ponack, L.L.P.

(57) ABSTRACT

A battery pack including a molded resin portion, which holds a part of or the entire battery, and an externally exposed output terminal. The battery pack further includes an insulating block, which is provided with a breaker mechanism for cutting-off current flow when an over-current flows. The insulating block is held by being inserted in the molded resin portion. The insulating block holds the output terminal on its surface. The output terminal held by the insulating block is held at a prescribed position so as to be externally exposed from the molded resin portion.

13 Claims, 18 Drawing Sheets

BATTERY PACK

BACKGROUND OF THE INVENTION

The present invention relates to a battery pack manufactured by inserting a part or the whole of a battery into a molded resin portion.

High dimensional accuracy is required for a battery pack. Particularly, high dimensional accuracy is required for the position of an output terminal. The reason is that the output terminal is accurately set to an attachment portion provided in electrical equipment to be connected to a power supply terminal of the electrical equipment so that poor contact does not occur. Currently, a commercially available battery pack has a structure in which a core pack with parts necessary for a battery connected thereto is inserted in an external case formed of plastic. With the battery pack of this structure, forming the external case in an accurate dimension can form the battery pack in prescribed outer dimensions. However, since the battery pack of this structure is assembled by inserting the core pack into the external case with effort, it is difficult to mass-manufacture the battery packs at low cost.

A battery pack which does not employ the external case has been developed in order to achieve a very simple assembly (see Japanese Laid-Open Patent Publication TOKUKAI No. 2000-315483).

This battery pack is manufactured by inserting a part of the core pack with components necessary for a battery connected thereto into a molded resin portion when the molded resin portion corresponding to an external case is molded. With the battery pack of this structure, the core pack is configured by connecting the parts necessary for a battery. This core pack is temporarily held in a molding chamber for molding the molded resin portion. Then, the battery pack is manufactured by injecting molten synthetic resin into the molding chamber. Since this battery pack is fixed when the molded resin portion is molded, it is possible to manufacture the battery pack with efficiency due to the omission of an external case. The molded resin portion composes a part of the external case of the battery pack, and serves to fasten components connected to the battery. Accordingly, since the core pack can be fastened when the molded resin portion is molded, there is a feature that enables the core pack to be manufactured with efficiency at low cost.

With the battery pack of this structure, as shown in FIG. 1, the core pack is inserted into and molded with the molded resin portion used as an external case. With this battery pack, a core pack 90 in which parts necessary for a battery, such as a circuit board 91 connected to a battery 92, are temporarily held in a molding chamber 94 of a metal mold 93. The core pack 90 is inserted by injecting molten plastic into the molding chamber 94 in the state in which a part of the core pack 90 is buried. After the plastic is set, the set plastic is removed from the mold, and thus, the battery pack is manufactured. This battery pack has a structure in which the molded resin portion and the core pack are integrally connected to each other without interstices and the structure can be mass-manufactured.

However, with the battery pack of this structure, since an output terminal separated from the battery pack is connected through a lead wire, there is a disadvantage that this part is manufactured at much expense in time and effort. In addition, with the battery pack of this structure, there is a disadvantage that disconnection of the lead wire or the like can occur. For this reason, in the case of a battery pack used for a cellular phone, for example, the structure in which an output terminal is connected through a lead wire is hardly used. This is because it requires the output terminal to be held at a prescribed position by being inserted into the molded resin portion. However, actually, it is very difficult to mold the molded resin portion with a metal plate as the output terminal must be temporarily and accurately held at the position in the molding chamber of the mold.

The present invention has been developed for solving the above-described disadvantages. It is an important object to provide a battery pack having an output terminal capable of being held at a prescribed position of a molded resin portion with a simple structure, and is capable of being mass-manufactured at low cost.

SUMMARY OF INVENTION

A battery pack according to the present invention comprises a molded resin portion which holds a part of or the whole of the battery inserted thereto, and an externally exposed output terminal. The battery pack further comprises an insulating block, which is provided with a breaker mechanism for cutting-off current flow when an over-current flows. The insulating block is held by being inserted in the molded resin portion. The insulating block holds the output terminal on its surface. The output terminal held by the insulating block is held at a prescribed position so as to be externally exposed from the molded resin portion.

The above battery pack has an advantage in that the output terminal is held at a prescribed position of the molded resin portion with a simple structure, and can provide mass-production of the battery pack at low cost. The reason is that, in the battery pack, the insulating block which is provided with the breaker mechanism is held by being inserted in the molded resin portion which holds a part of or the whole of battery inserted thereto, and the insulating block holds the output terminal on its surface, and the output terminal held by the insulating block is held at the prescribed position so as to be externally exposed from the molded resin portion. The battery pack of this structure has an advantage in that the output terminal is firmly fastened by a very simple structure without inserting a terminal board or the like for fastening the output terminal. An additional advantage is that the battery pack can be manufactured by inserting the insulating block, which is provided with the breaker mechanism, and the battery in the molded resin portion. In the structure in which the breaker mechanism and the output terminal are connected to each other in series, there is an advantage that the connection can be shortened between the breaker mechanism and the output terminal, and in addition, can simplify the structure. Accordingly, it is possible to provide an excellent electrical property that can discharge a large amount of current while reducing useless power consumption by reduction of internal resistance of the battery pack.

The insulating block may include a base block and a cover block separately formed of plastic, and the cover block is fastened to the base block. This insulating block can fasten the output terminal to the surface of the cover block.

A holding chamber may be provided between the cover block and the base block, and a breaker mechanism may be provided in the holding chamber. The breaker mechanism provided in the holding chamber may include a movable arm, and the movable arm protrudes externally outside from the cover block, and an externally protruding portion of the movable arm is fastened to a fastening metallic member connected to the output terminal.

A buried portion may be provided on the surface of the insulating block, and the insulating block may be inserted into the molded resin portion by filling the buried portion with synthetic resin which forms the molded resin portion.

In the battery pack, a fastened lead plate connected to a protrudent terminal of the battery may be provided in the insulating block, and the insulating block may be provided with a connection opening which opens upwardly of a connection portion of the fastened lead plate.

In the battery pack, a drawn-out lead plate fastened to a terminal of the battery may be fastened to the insulating block, and the drawn-out lead plate may protrude from one end of the insulating block, and the fore of the protruded part may be connected to the terminal of the battery. The drawn-out lead plate connected to the terminal may be provided with a bent portion that is bent in the direction that protrudes from the end face of the terminal at its fore end. The drawn-out lead plate may be bent in a U-shape, and the insulating block may be opposed to a terminal surface which the drawn-out lead plate is fastened to. The insulating block may have an insertion recessed portion, which the bent portion of the drawn-out lead plate is fitted into, the insulating block may be positioned at the prescribed position of the end face of the terminal in the state that the bent portion is inserted into the insertion recessed portion.

In the battery pack, the insulating block may be formed of high melting point plastic which is not deformed at the temperature of soldering. In the battery pack, the base block and the cover block may be formed of high melting point plastic which is not deformed at the temperature of reflow soldering.

In the battery pack, a temperature sensor may be connected to the output terminal, and a temperature signal may be provided from the output terminal in the state in which the breaker mechanism is opened. In the battery pack, a stopper for the movable arm, which moves to an open position, may be provided on and protrude from the interior surface of the holding chamber, which is provided with a breaker mechanism therein.

In the battery pack, an electronic component may be fastened to the output terminals, which are adjacent to each other, by soldering. In this battery pack, a notch portion may be provided at a corner between each of edges of the connection boundary of an electronic component opposed to each other and each of connection surfaces of the electronic component. In this case, the notch portion is filled with resin. In the battery pack, the electronic component may be fastened to the back surfaces of the output terminals by soldering, and an insulating portion for preventing the spread of solder may be formed integrally with the insulating block in the periphery of an area where the electronic component is soldered.

In the battery pack, width adjustment protruding portions may be integrally formed on both sides of the insulating block. In this case, the outer width of the outermost parts of the adjustment protruding portions is the same as the thickness of the battery.

The above and further objects and features of the invention will be more fully apparent from the following detailed description with the accompanying drawings.

BRIEF DESCRIPTION OF THE DRAWINGS

FIG. 13 is an enlarged cross-sectional view showing the insulating block taken along the line B-B shown in FIG. 11 in the state where the breaker mechanism is ON;

FIG. 19 is an enlarged cross-sectional view of another example of the breaker mechanism in the state where the breaker mechanism is ON;

FIG. 27 is a vertical longitudinal sectional view of the battery pack shown in

FIG. 2.

DETAILED DESCRIPTION OF THE PREFERRED EMBODIMENTS

Figure 1:
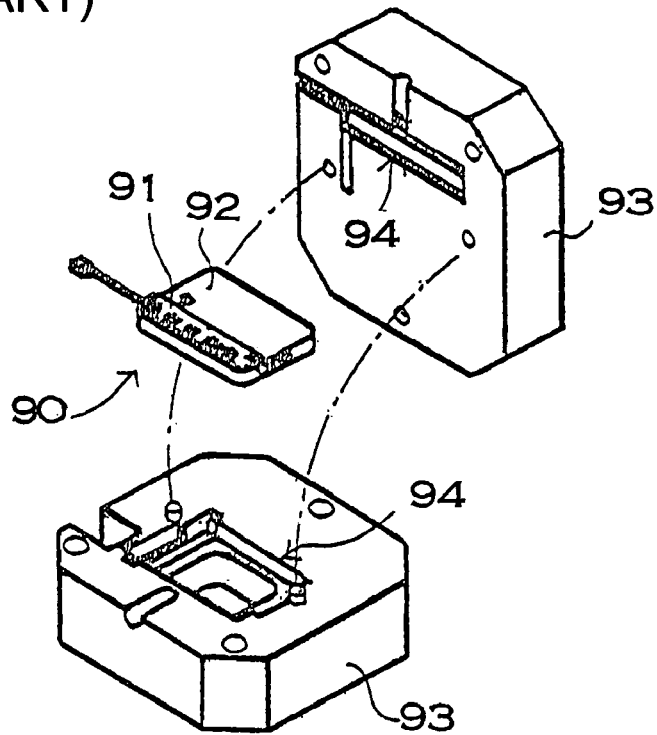
FIG. 1 shows a perspective view showing a method of producing a conventional battery pack.
Figure 2:
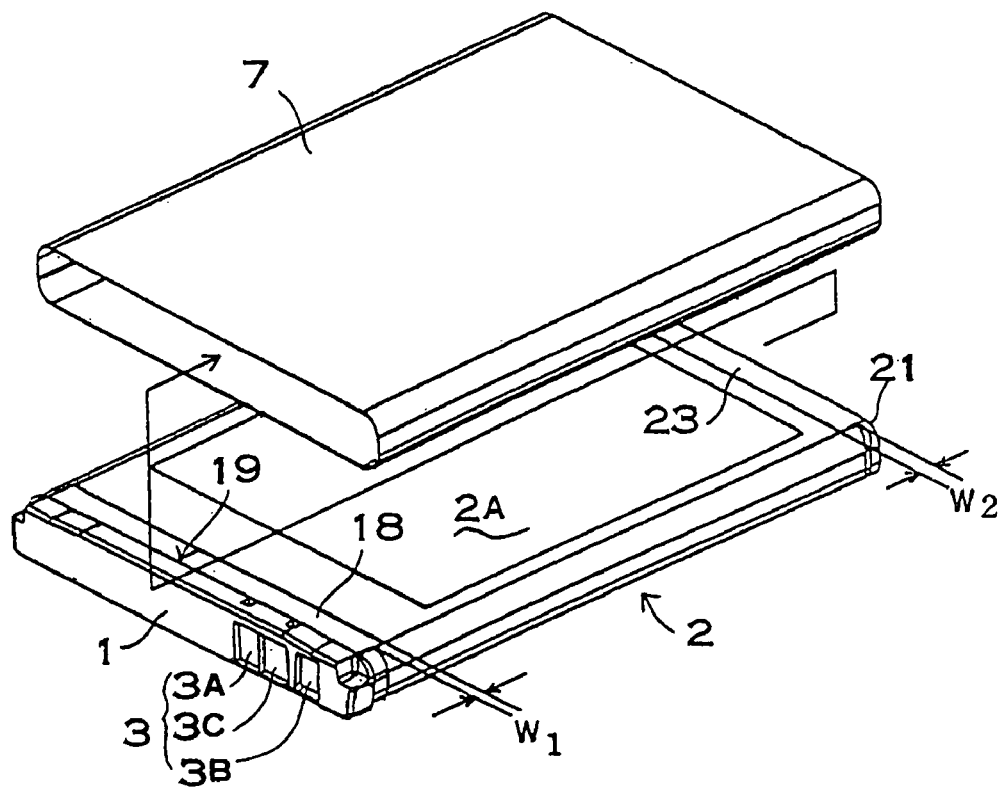
FIG. 2 is an exploded perspective view of a battery pack according to one embodiment of the present invention.

With a battery pack of FIG. 2, a molded resin portion 1 is molded on a battery end surface of a thin battery. When molded, this molded resin portion 1 fastens an insulating block 11 inserted thereto as shown in a cross-sectional view of FIG. 3. Although the molded resin portion 1 is fastened onto a terminal end surface where a protruding terminal 2B is provided in the battery pack of the figure, the insulating block may be inserted into a molded resin portion which is fastened onto a battery end surface opposite to the battery end surface where the protrudent terminal is provided. In the thin battery, though not illustrated, the insulating block may be inserted into a molded resin portion which is fastened onto one of both narrow side surfaces. With the battery pack where the insulating block is inserted to the side opposite to the protrudent terminal, or where the insulating block is inserted to the side surface of the thin battery, a lead member of the insulating block extends along the side surface of the thin battery and is connected to the protruding terminal.

Figure 4:
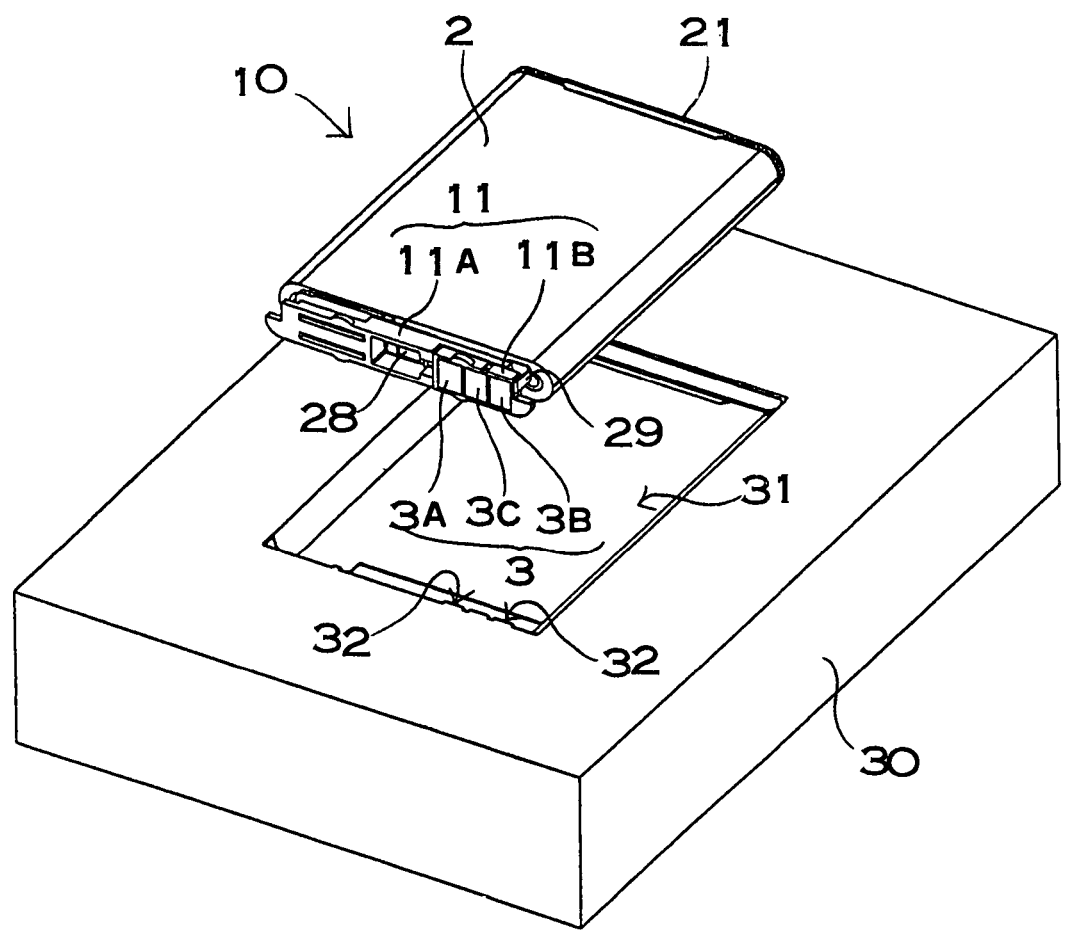
FIG. 4 is a perspective view showing the state where a core pack of the battery pack shown in FIG. 2 is provided in a mold.
Figure 5:
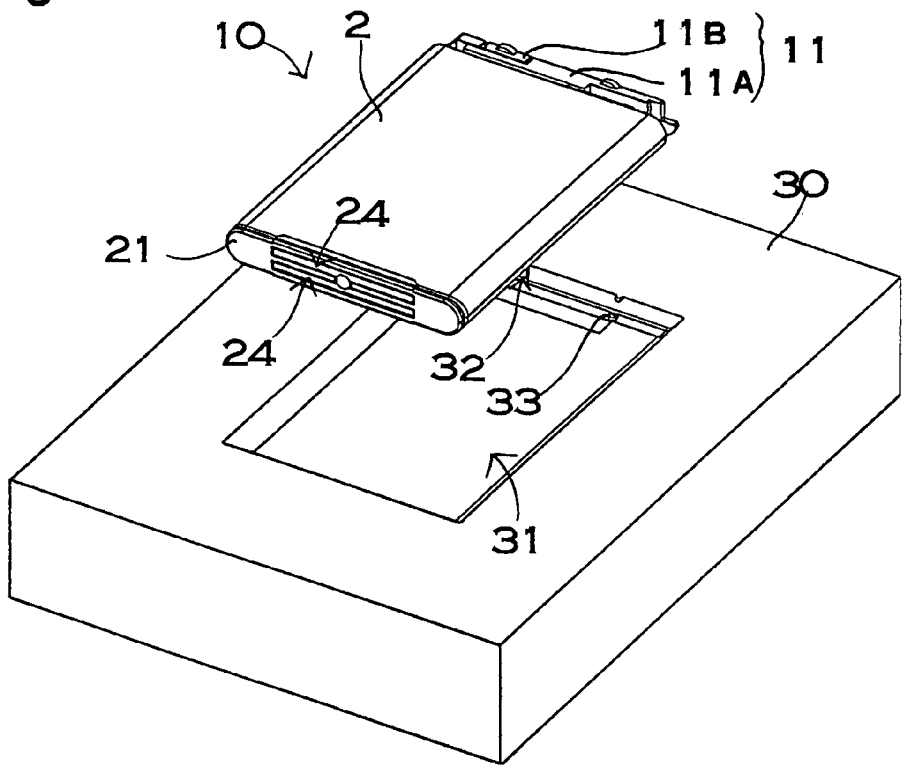
FIG. 5 is a perspective back view of the core pack and the mold shown in FIG. 4.
Figure 6:
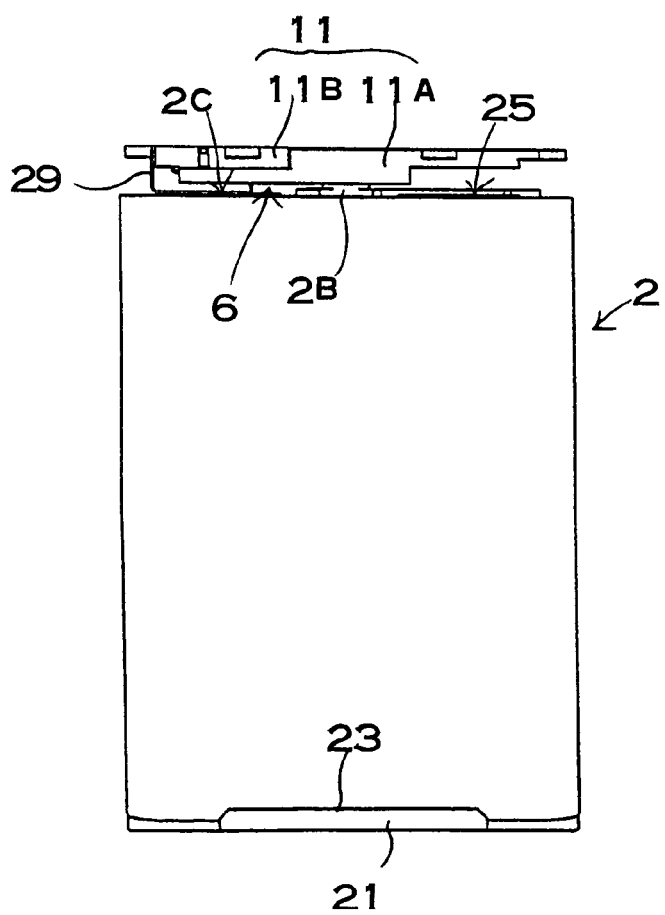
FIG. 6 is a plan view of the core pack and the mold shown in FIG. 4.
Figure 7:
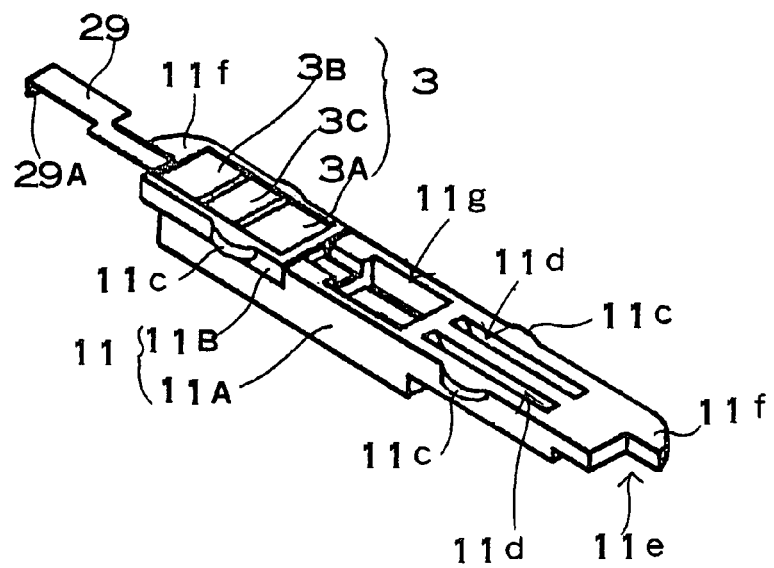
FIG. 7 is a perspective view of an insulating block.

With the battery pack, as shown in the perspective views of FIGS. 4 and 5, a core pack 10 of the battery 2 is temporarily held in a molding chamber 31 of a mold 30, and then molten resin is injected into the molding chamber 31. Thus, a part of the core pack 10, in which the insulating block 11 is positioned at a prescribed position, is inserted in the molded resin portion 1, and the battery pack is manufactured. The core pack 10 is composed of the battery 2 and the insulating block 11 connected thereto as shown in FIG. 6. In the core pack 10 shown in FIGS. 4 and 5, the insulating block 11 is connected to the battery 2. The core pack 10 with the connected insulating block 11 has the simplest structure, and can be mass-manufactured at low cost. However, though not illustrated, the battery pack of the present invention may have a structure in which a printed circuit board and so on is inserted into the molded resin portion in addition to the insulating block.

The insulating block 11 is provided with a breaker mechanism 4 which shuts down current to safely protect the battery 2 when an abnormality of the battery 2 occurs. The breaker mechanism 4 detects temperature or over-current and cuts off current flow.

The insulating block 11 is a molded member of plastic which is an insulating material. The insulating block 11 shown in FIGS. 7 to 14 includes a base block 11A and a cover block 11B, which are separately formed of plastic. The cover block 11B is fastened to the base block 11A. Output terminals 3 are fastened onto the surface of the cover block 11B. With the insulating block 11 of the figure, a holding chamber 17 is provided between the cover block 11B and the base block 11A, which are connected to each other. The breaker mechanism 4 is provided in the holding chamber 17. The insulating block may have a unitary structure in which the insulating block is not divided into the cover block and the base block. In addition, the insulating block may have a structure where a plastic case (not shown), into which a breaker mechanism is inserted, is fastened to or is inserted into the insulating block.

The insulating block 11 is formed of high melting point plastic which will not deform at the temperature of soldering an electronic component 20, and is preferably of high melting point plastic which will not deform at the temperature of reflow soldering with Pb-free solder paste. The high melting point plastic can be plastic such as a liquid crystal polymer (LCP) compound or polyphenylene sulfide (PPS). LCP and PPS have high strength with less warpage after molding in addition to excellent thermal resistance. However, the high melting point plastic is not specifically limited to LCP or PPS, any plastic which will not deform at the temperature of soldering can be used. Particularly, plastic, which will not deform at the temperature of soldering with Pb-free solder paste, is preferable.

With the insulating block 11, both the cover block 11B and the base block 11A are formed of high melting point plastic. The insulating block 11 is preferably formed of the same material of high melting point plastic. With this insulating block 11, the electronic component 20 is fastened onto the output terminals 3 by reflow soldering. The cover block 11B and the base block 11A are simply, easily, firmly and quickly fastened by ultrasonic welding. However, with the insulating block 11, it is not always necessary that a part where the output terminals 3 are not fastened, or the base block 11A of the insulating block 11 is formed of high melting point plastic. The reason is that the electronic component 20 is not fastened onto the part where the output terminals 3 are not provided. In the case of the insulating block 11 in which the cover block 11B and the base block 11A are formed of different plastic materials, both of them can be connected with an adhesive or a fit-in structure.

In the insulating block 11 of the figure, the cover block 11B and the base block 11A have contact surfaces forming a fit-in structure in order to be connected to each other with accurate positioning. The fit-in structure is composed of a plurality of fit-in holes 11b provided on the bottom of cover block 11B, and fit-in protrusions 11a provided at positions on the upper surface of base block 11A where fit-in protrusions 11a are fitted into fit-in holes 11b. As shown in the cross-sectional view of FIG. 12, the fit-in protrusions 11a are fitted into the fit-in holes 11b, thus the cover block 11B is connected at the prescribed position of base block 11A. The insulating block 11 in which the cover block 11B and the base block 11A are connected to each other has the same length in the longitudinal direction and width as those of the terminal end surface of the battery 2.

Width adjustment protruding portions 11c are integrally formed on both sides of the insulating block 11. The outer width of the outermost parts of the adjustment protruding portions 11c is the same as the thickness of the battery 2, which is the width of the terminal end surface. The insulating block 11 with the width adjustment protruding portions 11c is temporarily held in the molding chamber 31 of the mold 30, and can be inserted at the accurate position of the molded resin portion 1. The reason is that the molding chamber 31 of the mold 30 can be filled with synthetic resin while the insulating block 11 is temporarily held at the accurate position without a deviation by sandwiching the width adjustment protruding portions 11c by means of the mold 30. When the molded resin portion 1 is molded, the insulating block 11 and the battery 2 are temporarily held by sandwiching them by means of the mold 30. With the structure where the width adjustment protruding portions 11c of the insulating block 11 and the battery 2 are temporarily held by sandwiching them by means of the mold 30, both the battery 2 and the insulating block 11 can be inserted in an accurate position of the molded resin portion 1. That is, the battery 2, the insulating block 11, and the molded resin portion 1 can be accurately fastened.

In the insulating block 11, the width adjustment protruding portions 11c are provided in both the cover block 11B and the base block 11A. Thus, the width adjustment protruding portions 11c are provided in both edge parts of the insulating block 11. The insulating block 11 of this shape is temporarily held in the molding chamber 31 of the mold 30, and is accurately inserted in the molded resin portion 1 so that both the position and the posture thereof do not change. In addition, the insulating block 11 with the width adjustment protruding portions 11c has an advantage in that adjustment of the protruding amount of the width adjustment protruding portion 11c can easily change design so as to be attached to batteries 2 with different thickness.

Buried or recessed portions 11d are provided in the upper surface which is the front surface of the base block 11A of the insulating block 11. The buried portions 11d are filled with the molded resin portion 1, and are inserted into the molded resin portion 1. The reason is that the buried portions 11d are filled with synthetic resin, which forms the molded resin portion 1, in a process where the insulating block 11 is inserted into the molded resin portion 1. With the insulating block 11 inserted with this structure, the molded resin portion 1 can be firmly coupled onto the upper surface of the insulating block. However, though not illustrated, the buried portions may be provided in the bottom. The buried portions provided in the bottom firmly engage the insulating block with the molded resin portion. The buried portion may be formed in a shape that penetrates from the top to bottom. With this buried portion, synthetic resin filling the buried portion is coupled to synthetic resin filling in the top and bottom sides. In the foregoing structure, the molded resin portion 1 can be coupled onto the upper surface of the insulating block 11 so as not to be removed, in addition, the insulating block 11 can be fastened to the molded resin portion 1 by insert so as not to be removed.

The output terminals 3 are fastened onto the surface of the insulating block 11. With the insulating block 11, the output terminals 3 are fastened onto the upper surface of the cover block 11B by insert. Although the output terminals 3 are fastened to the cover block 11B, the output terminals may alternatively be fastened to the base block. Additionally to first and second output terminal 3A and 3B, which are the positive and negative output terminals, the insulating block 11 of the figure includes a signal terminal 3C between them. The signal terminal 3C is connected to the adjacent first output terminal 3A through the electronic component 20. The electronic component 20 is fastened onto the lower surfaces of the first output terminal 3A and the signal terminal 3C by soldering. The electronic components 20 can be a resistance, a temperature sensor such as a thermistor, a capacitor, or the like. The signal terminal and the output terminal may be connected with a lead wire. In this battery pack, an electric resistance between the signal terminal 3C and the first output terminal 3A is detected to identify the battery pack.

Figure 15:
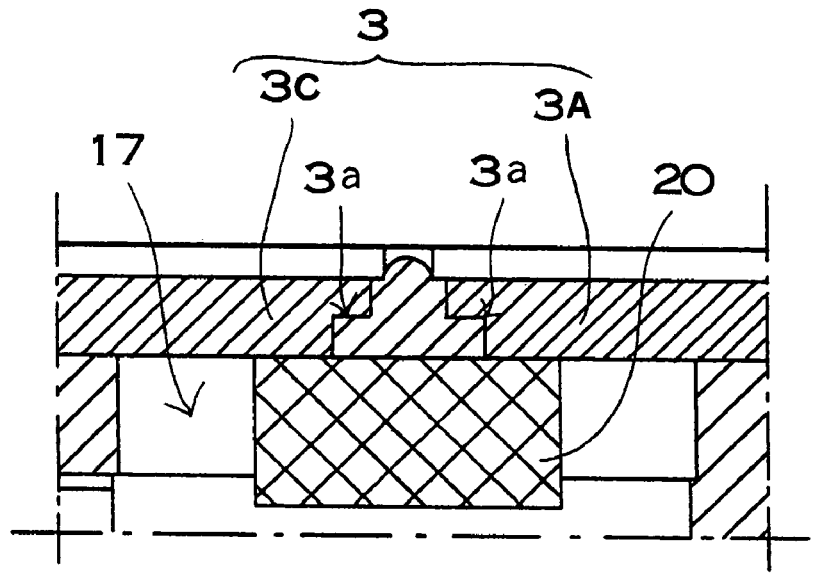
FIG. 15 is an enlarged cross-sectional view showing a connection structure between each output terminal and an electronic component of the insulating block shown in FIG. 12.
Figure 16:
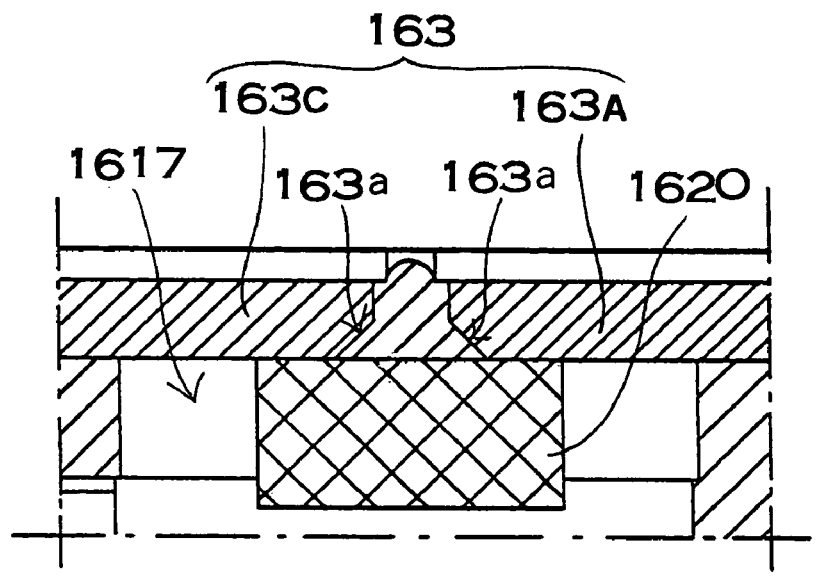
FIG. 16 is an enlarged cross-sectional view showing another example of the connection structure between each output terminal and an electronic component.

FIG. 15 is an enlarged, partial cross-sectional view of the output terminals 3 to which the electronic component 20 is fastened. The output terminal 3 of this figure substantially enlarges the boundary between the output terminals 3, to which the electronic component 20 is connected. In order to achieve this enlargement, the output terminals 3 adjacent to each other are provided with notch portions 3*a* at the corners between edges (the vertical surfaces in the figure) of the boundary that is opposed to each other and connection surfaces (in the horizontal surface of the figure) of the electronic component 20, respectively. In this case, the notch portions 3*a* are filled with resin which forms the insulating block 11. Although, in the output terminal 3 of the figure, the notch portions 3*a* are formed in a stair shape, they may be formed in a shape where the corner is diagonally cut off as shown in notch portions 163*a* of FIG. 16. With the output terminal 163 of this structure, it is possible to effectively prevent a short circuit at the narrow boundary of the output terminals 163 by a solder ball when the electronic component 1620 is fastened by soldering. The reason is that the interval between the output terminals 163 in the soldering surfaces of the electronic component 1620 can be enlarged. In addition, this structure has an advantage it that the output terminals 163 can be buried in the plastic of the insulating block so as not to remove them. The reason is that the plastic filling the notch portions 163*a* prevents the output terminals 163 from being removed. In FIG. 16, the first output terminal is represented by 163A, the signal terminal is represented by 163C, and the holding portion is represented by 1617, respectively.

Figure 17:
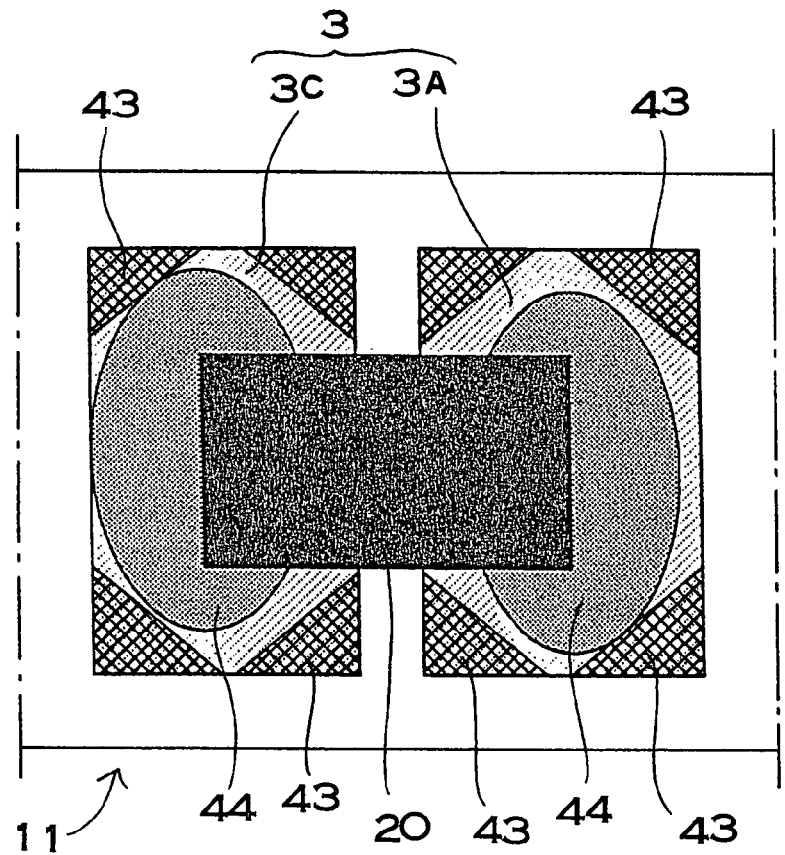
FIG. 17 is a plan view showing the connection structure of each output terminal and the electronic component.

In addition, as shown in FIG. 17, the insulating block 11 may include insulating portions 43 for preventing the spread of solder 44 on the back surface of the output terminals 3. In this case, the insulating portions 43 are formed integrally with the insulating block 11 in the peripheries of areas where the electronic component 20 is soldered. This structure has an advantage in that the spread of solder 44 can be prevented by the insulating portion 43.

Figure 18:
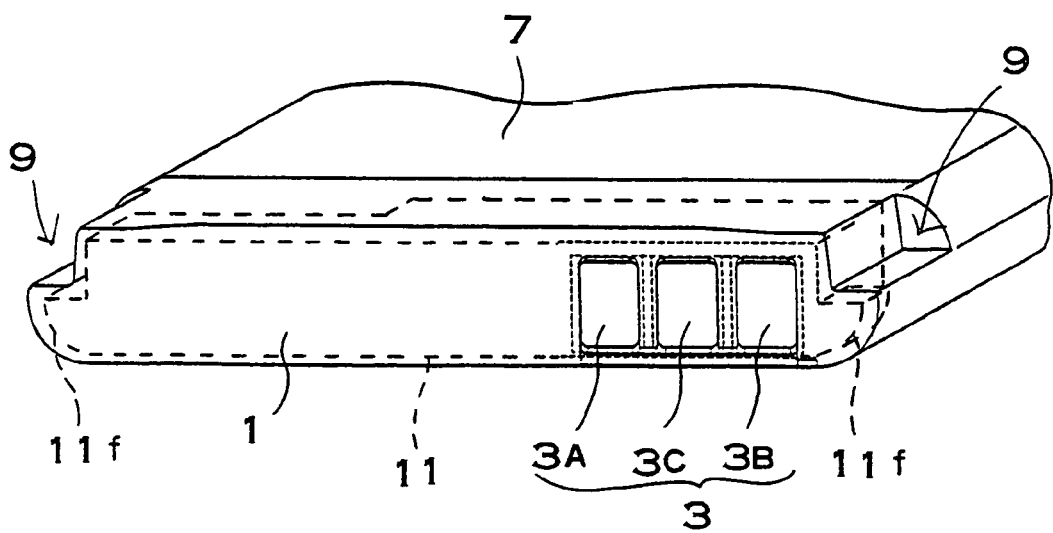
FIG. 18 is an enlarged perspective view of an output terminal part of the battery pack shown in FIG. 2.

The battery pack of FIG. 18 includes positioning recessed-portions 9 on both sides of the end surface where the output terminals 3 are provided. The battery pack including the positioning recessed-portions 9 can be set on an attachment portion (not shown) of an electric device without positioning deviation. The reason is that the positioning recessed-portion 9 can be fitted in the attachment portion and set at a prescribed position. In order to provide the positioning recessed-portions 9, the insulating block 11 includes cut-off portions 11*e* at both ends and reinforcement protruding portions 11*f* protruding from the ends. The reinforcement protruding portions 11*f* are inserted into the molded resin portion 1, and function to reinforce the corners of the battery pack.

With the insulating block 11, a fastened lead plate 28, which is connected to the battery 2, is connected to a drawn-out lead plate 29. The fastened lead plate 28 is connected to the protruding terminal 2B of the battery 2. The drawn-out lead plate 29 is connected to a plane part 2C of the terminal end surface beside the protruding terminal 2B. With the insulating block 11 of the figure, the fastened lead plate 28, which is connected to the protrudent terminal 2B of the battery 2, is connected to the base block 11A. The drawn-out lead plate 29 is connected to the cover block 11B. The fastened lead plate 28 and the drawn-out lead plate 29 are fastened to the base block 11A or the cover block 11B by insert. However, it is not always necessary to fasten the fastened lead plate 28 and the drawn-out lead plate 29 by insert. They may be fitted in the base block 11A or the cover block 11B, or be fastened with an adhesive. The fastened lead plate 28 and the drawn-out lead plate 29 are fastened to the protruding terminal 2B or the plane part 2C of the terminal end surface by spot welding or laser welding.

Figure 11:
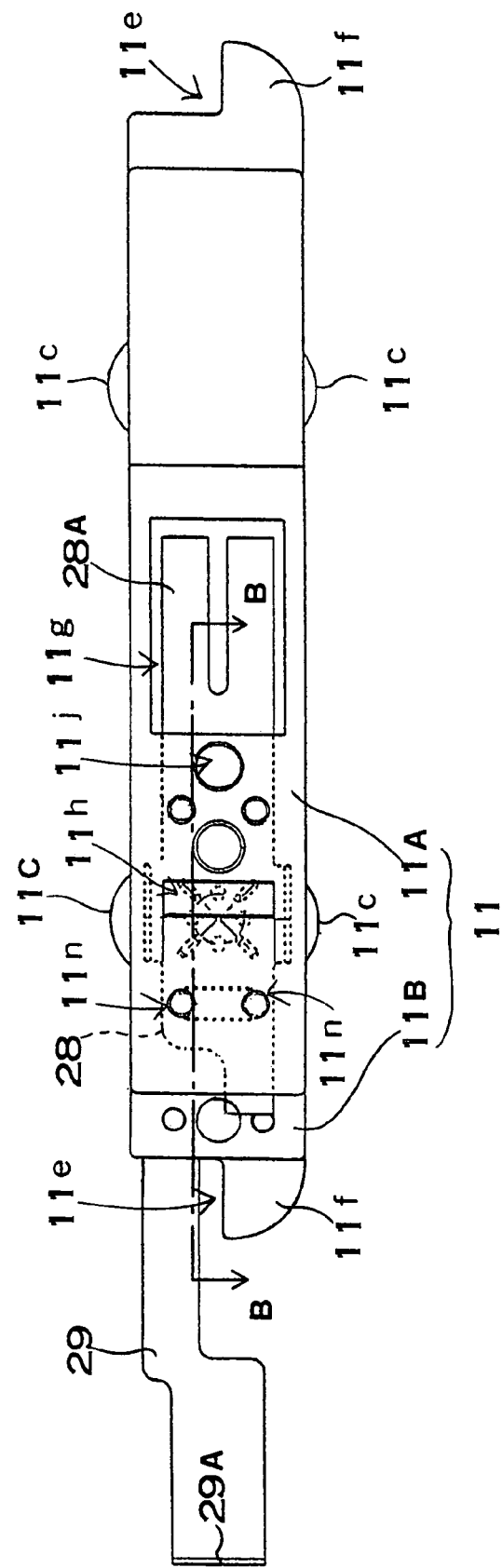
FIG. 11 is a bottom view of the insulating block shown in FIG. 7.

In order to connect the fastened lead plate 28 to the protruding terminal 2B, the insulating block 11 is provided with a connection opening 11*g* which opens upwardly of a connection portion 28A of the fastened lead plate 28. With the insulating block 11, since the fastened lead plate 28 is provided in the base block 11A, the connection opening 11*g* is provided in the base block 11A. The connection portion 28A of the fastened lead plate 28 is provided with a slit as shown in FIG. 11. The connection portion 28A of this shape can be welded to the protrudent terminal 2B by spot welding, thus, it is possible to surely reduce a reactive current. A fixed contact 14, which composes the breaker mechanism 4, is fastened at the fore end of the fastened lead plate 28. The fastened lead plate 28 is provided with a plurality of contact protruding portions 28B, which are provided so as to protrude upward. The contact protruding portions 28B are externally exposed in the holding chamber 17 provided between the base block 11A and the cover block 11B. A PTC 15 is provided on the contact protruding portions 28B. The contact protruding portions 28B are surely and electrically connected to the bottom of the PTC 15 provided thereon.

Figure 3:
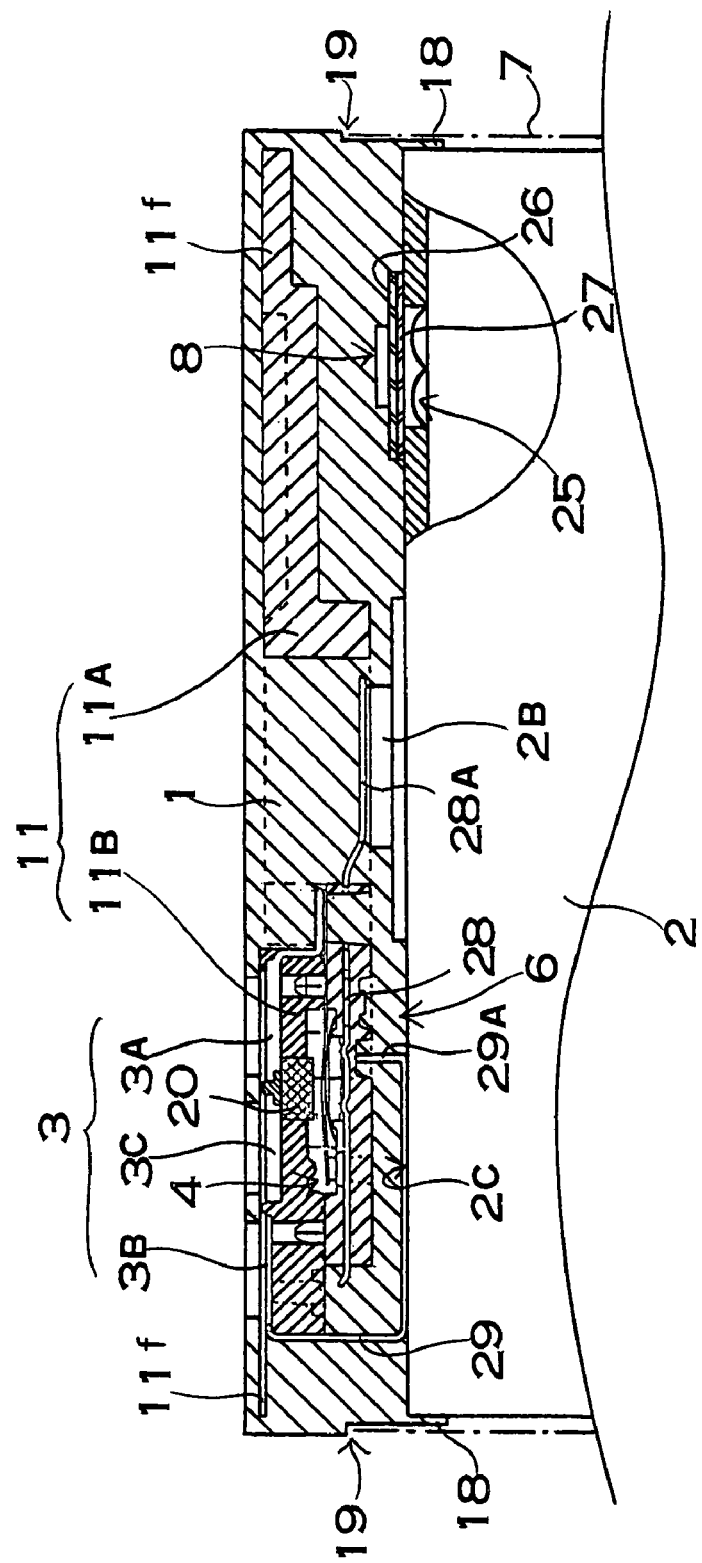
FIG. 3 is a horizontal cross-sectional view of the battery pack shown in FIG. 2.

The drawn-out lead plate 29 is a metal plate connected to the second output terminal 3B which is one of the output terminals. The drawn-out lead plate 29 is drawn out from one end of the insulating block 11. The fore of the drawn-out part is connected to the plane part 2C which is the terminal of the battery 2. The drawn-out lead plate 29 is provided with a bent portion 29A at its fore end. The drawn-out lead plate 29 is bent in a U-shape in the state in which its fore is connected to the plane part 2C of the terminal end surface. As shown in FIGS. 3 and 6, when the drawn-out lead plate 29 is bent in a U-shape, the insulating block 11 is provided in the posture where the insulating block 11 is opposed to the terminal end surface, which the drawn-out lead plate 29 is connected to, in other words, in the posture where the insulating block 11 is parallel to the terminal end surface. The bent portion 29A of the drawn-out lead plate 29 is bent in the direction that protrudes from the terminal end surface. With the insulating block 11, the insertion recessed portion 11*h*, which the bent portion 29A of the drawn-out lead plate 29 is fitted in, is provided on the surface opposite to the terminal end surface. The bent portion 29A of the drawn-out lead plate 29 is inserted into the insertion recessed portion 11*h*, thus, the insulating block 11 is positioned at a prescribed position of the terminal end surface. In other words, the bent portion 29A and the insertion recessed portion 11*h* are located at certain positions so that the insulating block 11 is positioned at the prescribed position relative to the terminal end surface when the bent portion 29A is inserted into the insertion recessed portion 11*h*. The insulating block 11 of this structure is connected at the prescribed position to the battery 2 as follows. The fore of the drawn-out lead plate 29 is fastened to the plane part 2C of the terminal end surface. The drawn-out lead plate 29 is bent a U-shape. The bent portion 29A is inserted into the insertion recessed portion 11*h*, and the fastened lead plate 28 is fastened to the protruding terminal 2B.

In the state in which the insulating block 11 is connected to the battery 2, a dimension adjustable clearance 6 is provided between the insulating block 11 and the battery end surface. When the molded resin portion 1 is molded, the dimension adjustable clearance 6 allows for the fastened lead plate 28 and the drawn-out lead plate 29 to deform, thus, the space between them can be adjusted. In order to adjust the space of the dimension adjustable clearance 6, the fastened lead plate 28 and the drawn-out lead plate 29 are made of deformable flexible metal plates when temporarily held in the molding chamber 31 of the mold 30. With this structure, any dimensional deviations of the battery 2 can be absorbed by the dimension adjustable clearance 6.

The insulating block 11 is provided with the breaker mechanism 4 in the holding chamber 17. The breaker mechanism 4 of FIG. 8 includes a movable arm 12 which turns a movable contact 12A on the fore end ON/OFF, a temperature deformable metal 13 which deforms this movable arm 12 according to temperature, a PTC 15 which retains the movable arm 12 in the OFF state, a fixed contact 14 which is in contact with the movable contact 12A fastened at the fore end of the movable arm 12, and the fastened lead plate 28 to which this fixed contact 14 is fastened.

Figure 8:
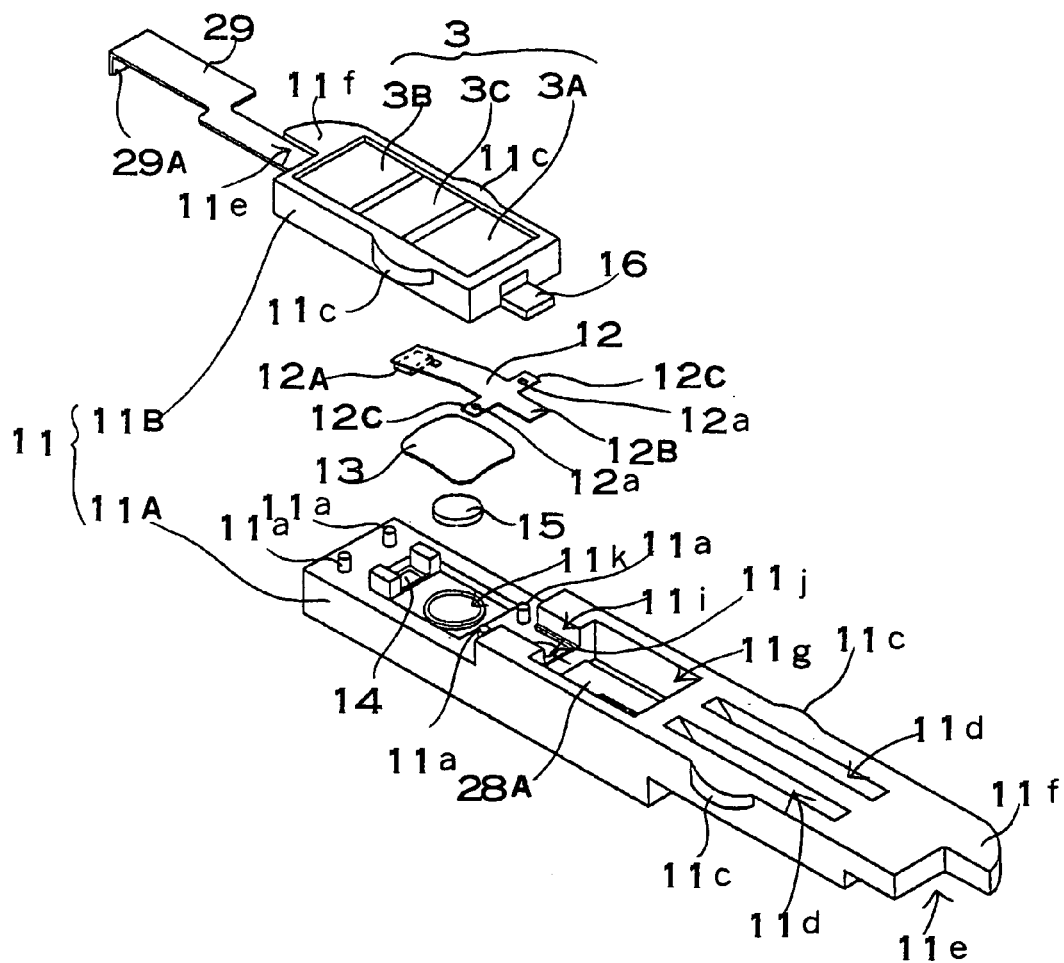
FIG. 8 is an exploded perspective view of the insulating block shown in FIG. 7.
Figure 9:
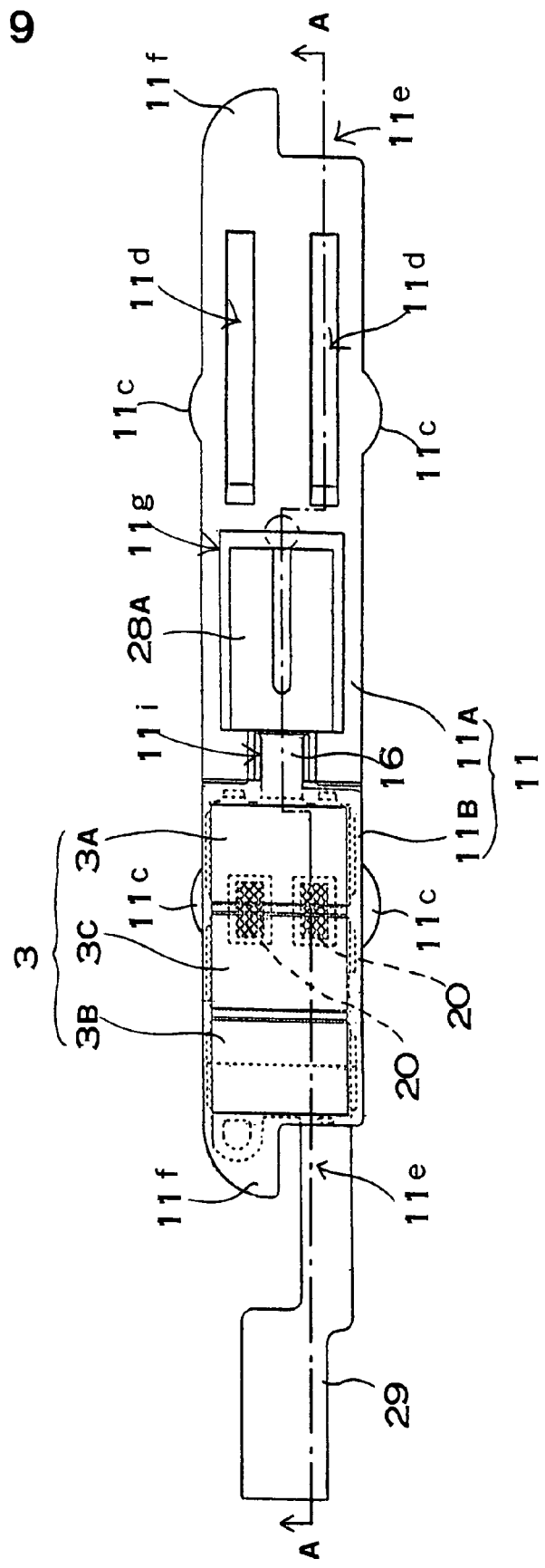
FIG. 9 is a plan view of the insulating block shown in FIG. 7.
Figure 10:
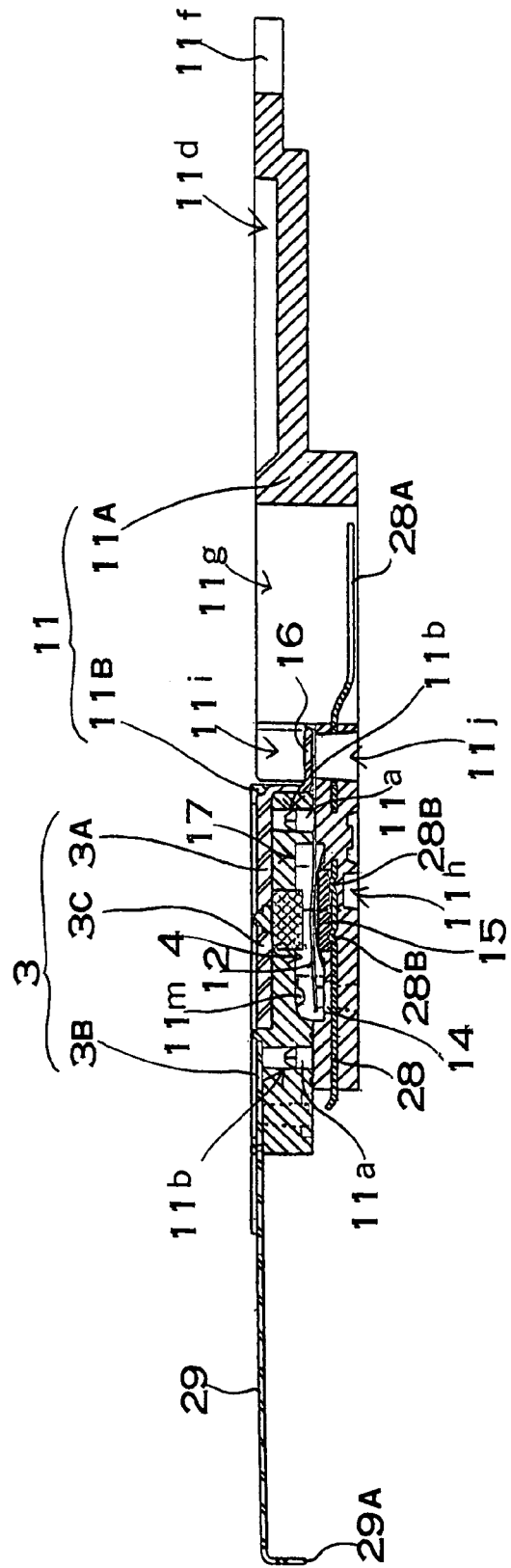
FIG. 10 is a cross-sectional view of the insulating block taken along the line A-A of FIG. 9.
Figure 13:
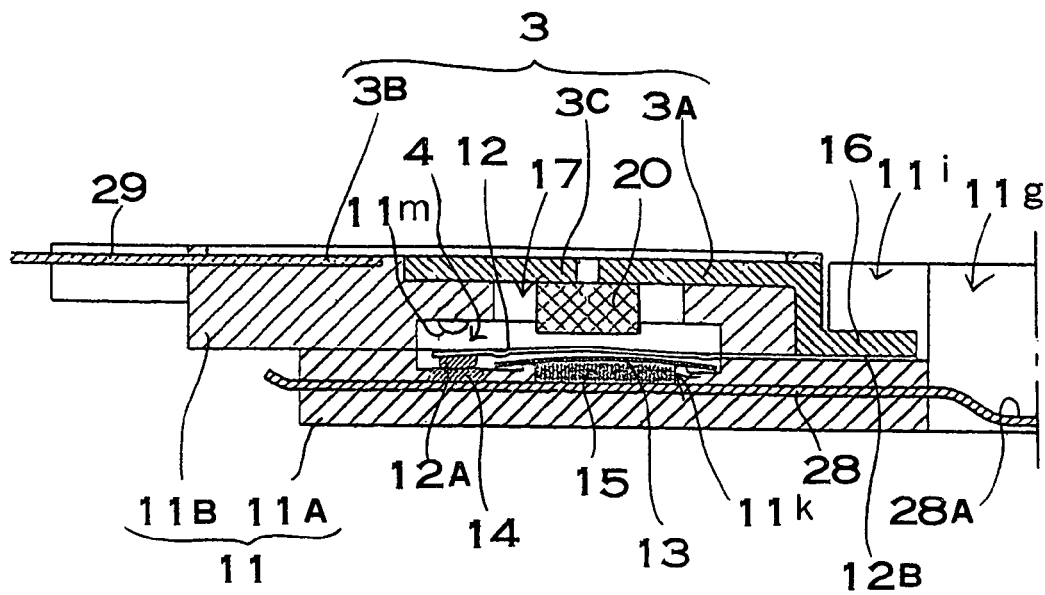
Figure 14:
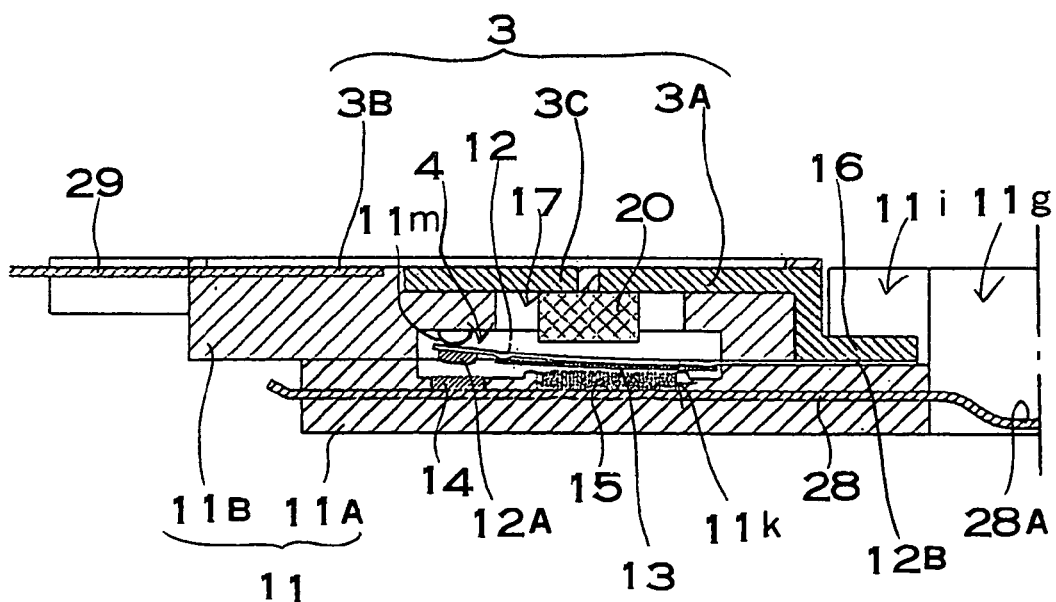
FIG. 14 is an enlarged cross-sectional view showing the state where the breaker mechanism shown in FIG. 13 is OFF.
Figure 19:
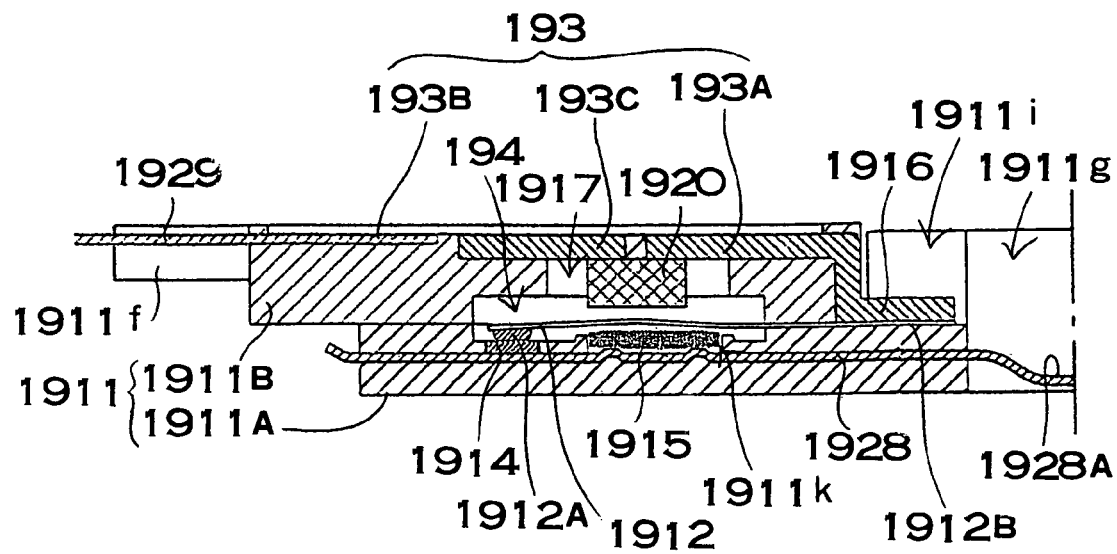
Figure 20:
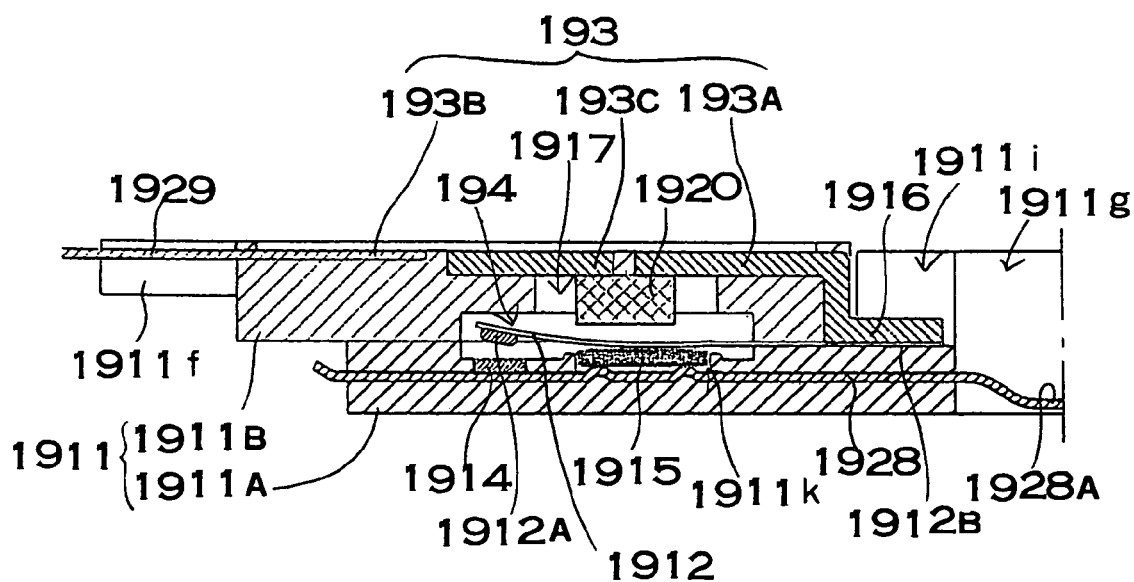
FIG. 20 is an enlarged cross-sectional view showing the state where the breaker mechanism shown in FIG. 19 is OFF.

In the breaker mechanism 4 of FIG. 8, the temperature deformable metal 13 is laminated on the movable arm 12. The temperature deformable metal 13 is heated with the heat of the movable arm 12, thus, deformation of the temperature deformable metal 13 turns the movable arm 12 ON/OFF. As shown in FIGS. 19 and 20, the breaker mechanism may have a movable arm 1912 consisting of a temperature deformable metal, and deforms when the movable arm 1912 is directly heated. In the breaker mechanism 4, which turns the movable arm 12 ON/OFF with the temperature deformable metal 13, as shown in FIGS. 13 and 14, the temperature deformable metal 13 deforms, and thus thrusts the movable arm 12 and turns it ON/OFF. In a breaker mechanism 194 in which the movable arm 1912 consists of a temperature deformable metal, as shown in FIGS. 19 and 20, the movable arm 1912 deforms due to heat and is turned ON/OFF. Besides, in FIGS. 19 and 20, components which are the same as or similar to those of the aforementioned embodiment, are identified with numerals with the same last digit(s) of reference numerals except the first two digits of the numerals and their description is omitted. Note that the first two digits correspond to the corresponding figure number (i.e. 19)

In the breaker mechanism 4, in which the movable arm 12 heats the temperature deformable metal 13, a metal plate with high electric resistance such as a stainless plate of SUS304 is used as a movable arm 12. This breaker mechanism 4 can be quickly turned from ON to OFF, when an over-current flows. For example, in the case of the breaker mechanism 4, which employs the movable arm 12 of phosphor bronze, since the electric resistance of movable arm 12 is small, it take time to turn from ON to OFF when an over-current flows. In comparison of the time to turn from ON to OFF where the breaker mechanisms 4 with movable arms 12 which are formed in the same shape and of phosphor bronze and SUS304 were made for an experiment, the time in the case of phosphor bronze was 20 seconds, while the time in the case of SUS304 was about 1 second where 6 A of over-current flows. This shows that phosphor bronze takes a longer time.

Figure 12:
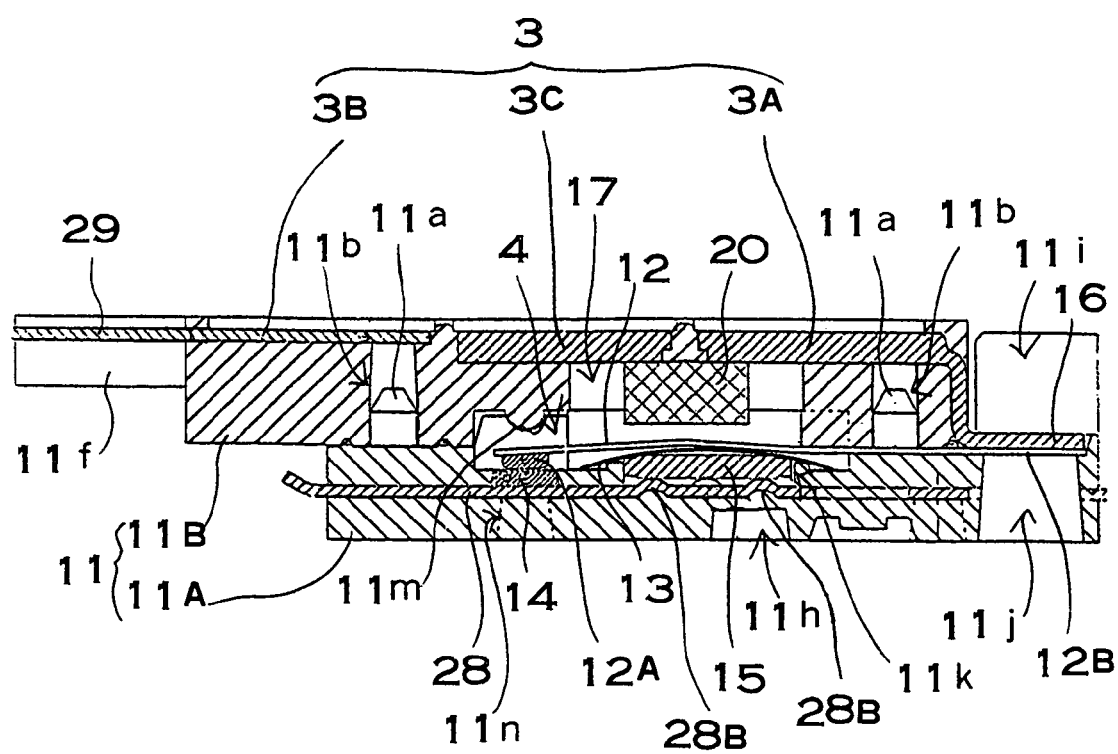
FIG. 12 is an enlarged cross-sectional view showing a breaker mechanism of the insulating block shown in FIG. 10.

In the state where an over-current does not flow and the temperature deformable metal 13 is not heated, the movable contact 12A fastened at the fore end of the movable arm 12 is in contact with the fixed contact 14, and thus the movable arm 12 is in the ON state. When the temperature deformable metal 13 is heated, the movable contact 12A is spaced away from the fixed contact 14, thus the movable arm 12 turns OFF. The temperature deformable metal 13 can be a bimetal or a trimetal in which a plurality of metals with different thermal expansion coefficients are laminated. When temperature rises, the temperature deformable metal 13 deforms, and spaces the movable contact 12A in the ON position away from the fixed contact 14, and thus turns the movable contact 12A to the OFF position. The insulating block 11 shown in FIG. 12 is provided with a stopper 11*m* for stopping the movable arm 12, which moves to the open position, at a prescribed position. This stopper 11*m* is provided in the cover block 11B so as to protrude from the interior surface of the holding chamber 17. This stopper 11*m* prevents that the movable arm 12, which moves to the open position, from contacting the electronic component 20 provided in the holding portion 17.

Figure 21:
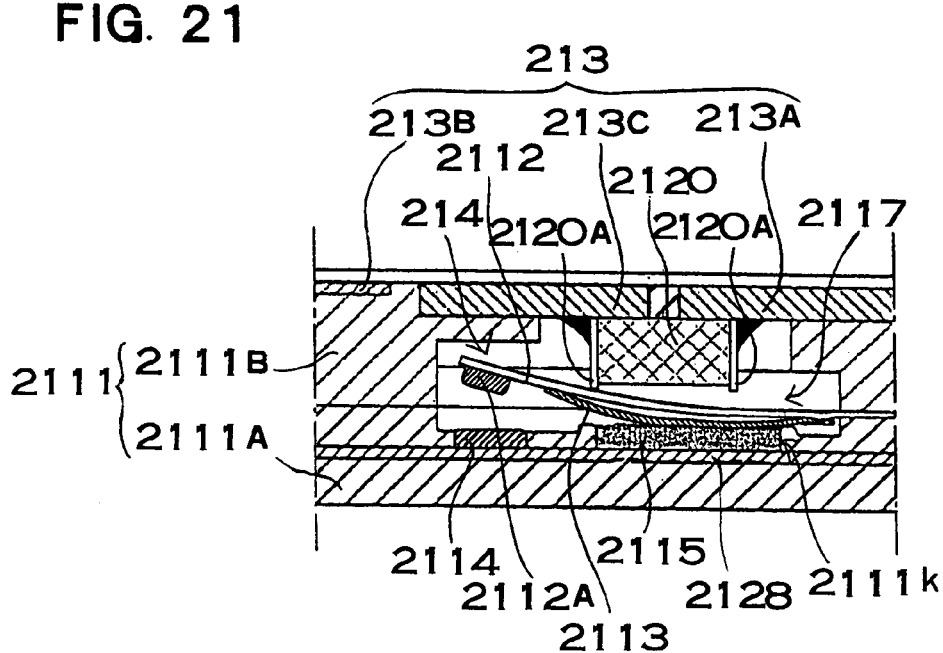
FIG. 21 is an enlarged cross-sectional view of another example of the breaker mechanism in the state where the breaker mechanism is OFF.

However, in the breaker mechanism, as shown in FIG. 21, a movable arm 2112, which moves to the open position, may be in contact with an electronic component 2120 provided in the holding portion 2117. In this case, the electrical equipment can determine that the breaker mechanism 214 is in the open state. In this breaker mechanism 214, the movable arm 2112 and the electronic component 2120 are positioned so that the movable arm 2112, which moves to the open position, is in contact with the electronic component 2120. In the electronic component 2120 which can be in contact with the movable arm 2112, since the electric resistance between the signal terminal 213C and the first output terminal 213A varies, the electrical equipment can determine that the breaker mechanism 214 is in the open state by detecting the variation of the electric resistance. As shown in FIG. 21, in the case where a chip type component having terminals 2120A for connection at both ends is used as the electronic component 2120, when the movable arm 2112, which moves to the open position, is in contact with the terminal 2120A on the side of the signal terminal 213C, the signal terminal 213C and the first output terminal 213A are bypassed by the movable arm 2112, thus, the resistance varies. Accordingly, detecting this variation of electric resistance can determine that the breaker mechanism 214 is in the open state. The electronic components 2120 can be a resistance, a temperature sensor such as a thermistor, a capacitor, or the like. When a temperature sensor such as a thermistor is used as the electronic component, it is not always necessary to use an electronic component with terminals for connection at both ends. The reason is that, when the movable arm, which moves to the open position, is in contact with the surface of the electronic component, which is the temperature sensor, the electric resistance of the temperature sensor is varied by being heated due to heat of the movable arm. Accordingly, detecting this variation of electric resistance can determine that the breaker mechanism is in the open state. Besides, in FIG. 21, components, which are the same as or similar to those of the aforementioned embodiment, are identified with numerals in which the first two digits correspond to a figure (i.e. 21) and the last digit(s) correspond to the same reference numerals and their description is omitted.

The insulating block 11 shown in FIG. 11 and FIG. 12 is provided with detection holes 11n for measuring the operating temperature of the breaker mechanism 4. The detection holes 11n of the figure are located under the fixed contact 14 in the bottom of base block 11A. The detection holes 11n opens so that the lower surface of the fastened lead plate 28, which is inserted into the base block 11A, is exposed externally of the base block 11A. A rod for temperature detection is inserted into the detection hole 11n, and the fore end of the rod is in contact with the lower surface of the fastened lead plate 28. Thus, the operating temperature at which the breaker mechanism 4 is in the open state is measured. Accordingly, the insulating block 11 with the detection hole 11n has an advantage in that it can accurately measure the operating temperature of the breaker mechanism 4, and provide the breaker mechanism 4 with high quality, even in the state that the base block 11A and the cover block 11B are fixedly connected to each other.

In the case where the temperature deformable metal 13 is heated by the movable arm 12, or the movable arm 12 is directly heated as a temperature deformable metal, when an over-current flows, the breaker mechanism 4 turns the movable contact 12A from ON to OFF. Although not illustrated, in the breaker mechanism, a heating resistance may be connected to the battery in series. In this case, the movable arm is switched by heating the temperature deformable metal by means of this heating resistance, and thus, a current can also be cut off when an over-current is detected.

The movable arm 12 is an elastically deformable conductive metal plate. The movable contact 12A is fastened in the fore of the movable arm 12, which is a surface opposed to the fixed contact 14. The base end of the movable arm 12 is fastened to a fastening metallic member 16 connected to the output terminal 3. The movable arm 12 is connected to the first output terminal 3A which is one of the output terminals. The base end of the movable arm 12 protrudes externally from the cover block 11B. This externally protruding portion 12B is fastened to the fastening metallic member 16 connected to the output terminal 3 with a welding structure by spot welding, laser welding or the like. With the movable arm 12 of FIG. 8, fastening pieces 12C, which are sandwiched between the cover block 11B and base block 11A, protrude transversely at both sides so as to form a cross shape. Positioning holes 12a, which the fit-in protrusion 11a provided in base block 11A is inserted in, are provided in the fastening pieces 12C, which protrude transversely at both sides. The movable arm 12 of this structure is positioned at the prescribed position by inserting the fit-in protrusions 11a into the positioning holes 12a. This movable arm 12 has an advantage in that it stably operates by accurately switching ON/OFF. The movable arm 12 is sandwiched between the cover block 11B and the base block 11A, and is surely fastened in the accurate posture. The externally protruding portion 12B, which protrudes externally of cover blocks 11B, is fastened to the fastening metallic member 16 by welding and so on. Therefore, the variation of the connection state between the externally protruding portion 12B and the fastening metallic member 16 does not affect operation of the movable arm 12.

The externally protruding portion 12B and the fastening metallic member 16 are connected to each other in a part that protrudes from the cover block 11B. Accordingly, in order to insert a connection part between the externally protruding portion 12B and the fastening metallic member 16, the base block 11A is provided with a guide recessed portion 11i for fitting the connection part in the middle of the width direction. As shown in the cross-sectional view of FIG. 12, the base block 11A is provided with a connection hole 11j under the guide recessed portion 11i. The externally protruding portion 12B is connected to the fastening metallic member 16 by spot welding through the connection hole 11j.

The PTC 15 retains the movable arm 12 that is turned from ON to OFF in the OFF position, when an over-current flows. When the movable arm 12 is turned to OFF, as shown in FIGS. 14 and 20, the lower surfaces of the movable arms 12 and 1912 come in contact with the upper surfaces of the PTCs 15 and 1915. The PTCs 15 and 1915 in this state electrically connect the fastened lead plates 28 and 1928, which the fixed contacts 14 and 1914 are fastened to, to the movable arms 12 and 1912. Accordingly, small currents flow into the PTCs 15 and 1915, and these currents heats the PTCs 15 and 1915. The heated PTCs 15 and 1915 heat the movable arms 12 and 1912, and hold the movable arms 12 and 1912 in the OFF state. Thus, the breaker mechanisms 4 and 1914, which the PTCs 15 and 1915 are provided in, are held in the state that is turned in the OFF state.

With the insulating block 11 of the figure, the fastened lead plate 28 is fastened to the base block 11A, and the fixed contact 14 is provided at the fore of this fastened lead plate 28.

With the insulating block 11 of the figure, the cover block 11B and the base block 11A are assembled by connecting them to each other as follows.

(1) The PTC 15 and the temperature deformable metal 13 are laminated and provided in the holding chamber 17 of base block 11A. The movable arm 12 is laminated on the temperature deformable metal 13. The holding chamber 17 is formed in the base block 11A. In order to position the PTC 15 at the prescribed position of this holding chamber 17, a setting recessed portion 11k, which the PTC 15 can be fitted in, is provided in the base block 11A. The PTC 15 is inserted into this setting recessed portion 11k, and is positioned at the prescribed position. The movable arm 12 is set at the prescribed position by inserting the fit-in protrusion 11a of base block 11A into the positioning hole 12a of fastening piece 12C.

(2) The cover block 11B is set on the base block 11A. The cover block 11B is set at the prescribed position of base block 11A by inserting the fit-in protrusion 11a of the base block 11A into the fit-in hole 11b provided in the lower surface of the cover block 11B. In this case, the externally protruding portion 12B of the movable arm 12 and the fastening metallic member 16 are fitted in the guide recessed portion 11i.

(3) The cover block 11B is fastened to the base block 11A by ultrasonic welding.

(4) Subsequently, one of the terminals for spot welding is inserted in the connection hole 11j provided in the base block 11A. The externally protruding portion 12B of the movable arm 12 and the fastening metallic member 16 are sandwiched by the terminals for spot welding, and thus are connected by applying a welding current.

The above insulating block 11 is connected to the battery 2 through the fastened lead plate 28 and the drawn-out lead plate 29, and thus serves as the core pack 10 of the battery 2. When this core pack 10 is temporarily held in the molding chamber 31 of the mold 30, the dimension adjustable clearance 6 is adjusted by deformation of the fastened lead plate 28 and the drawn-out lead plate 29. Accordingly, the relative position between the output terminal 3 and the battery 2 is accurately adjusted. The dimensional deviation of the battery 2 is corrected due to the amount of deformation of the fastened lead plate 28 and the drawn-out lead plate 29. Thus, the output terminal 3 is positioned at the accurate position. The battery 2 has dimensional deviation of its length produced in the manufacturing process. The dimension adjustable clearance 6 between the insulating block 11 and the battery end surface varies, thus, the dimensional deviation of the longitudinal direction of the battery 2 is absorbed. In the case of the battery pack, which has the battery 2 longer than the standard size, the insulating block 11 is positioned close to the battery end surface, thus the dimension adjustable clearance 6 is small. In the case of the battery pack, which has the battery 2 shorter than the standard size, the dimension adjustable clearance 6 is wide.

A movable pin described later thrusts the output terminal 3 of the insulating block 11 toward the reference plane of the mold 30, the core pack 10 with the above structure is held at the prescribed position.

FIGS. 22 to 26 show molds each of which has the movable pin for thrusting the insulating block toward the reference plane of the mold. In these molds 2230, 2330, 2430, and 2530, the movable pins 2233, 2333, 2433, and 2533, which protrude in the molding chambers 2231, 2331, 2431, and 2531, thrust the output terminals 223, 233, 243, and 253 of the insulating blocks 2211, 2311, 2411, and 2511 toward the reference planes 2232, 2332, 2432, and 2532 of the molding chambers 2231, 2331, 2431, and 2531. The movable pins 2233, 2333, 2433, and 2533 are guided to recessed portions which are fit attachment portions (not shown) provided in the insulating blocks 2211, 2311, 2411, and 2511, and temporarily hold the insulating blocks 2211, 2311, 2411, and 2511 at the accurate positions. In the state where the movable pins 2233, 2333, 2433, and 2533 hold the insulating blocks 2211, 2311, 2411, and 2511 at the prescribed positions of the molding chambers 2231, 2331, 2431, and 2531, molten resin is started to be injected to the molding chambers 2231, 2331, 2431, and 2531, thus, the molded resin portions are formed. In these figures, the batteries are represented by 222, 232, 242, and 252.

Figure 22:
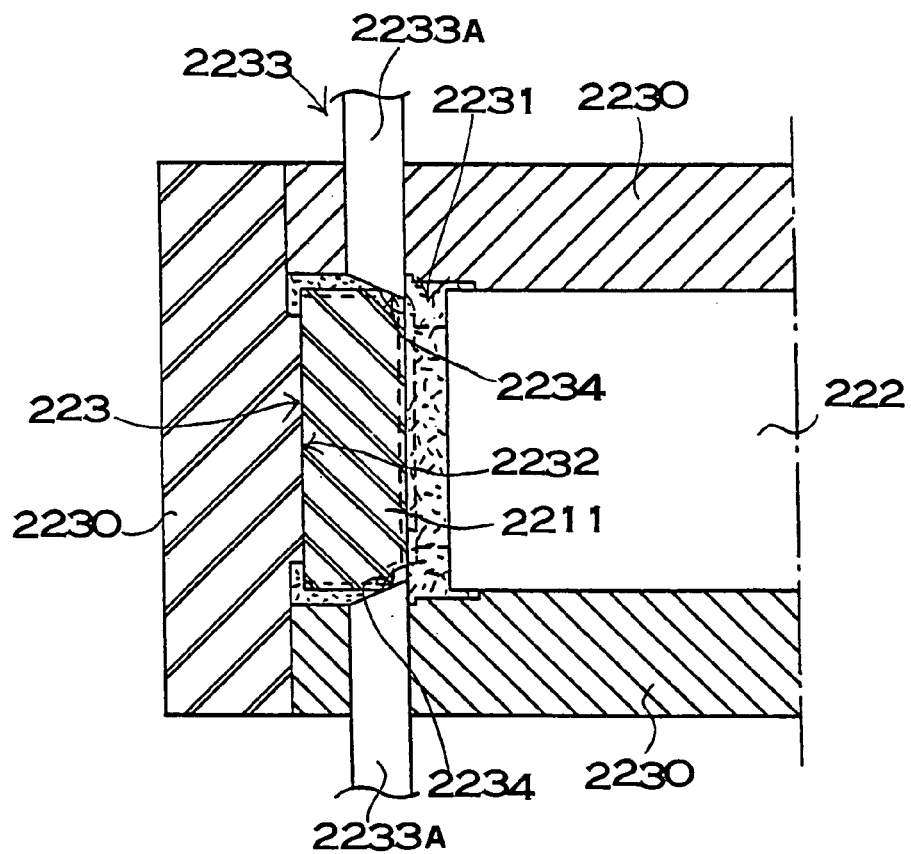
FIG. 22 is a cross-sectional view showing an example of a mold which molds a molded resin portion.

The movable pin 2233 of the mold 2230 of FIG. 22 is a linear-motion pin 2233A, which elastically protrudes inside the molding chamber 2231 in the direction parallel to both surfaces of the insulating block 2211. This linear-motion pin 2233A has an inclined surface 2234 at its fore and, and is guided to the fit attachment portion (not shown) of the insulating block 2211. The insulating block 2211 is thrust toward the reference plane 2232 of the mold 2230 by the inclined surface 2234. The inclined surface 2234 is inclined in the direction that can thrust the surface of the insulating block 2211 toward the reference plane 2232 of the mold 2230 when the linear-motion pin 2233A moves toward the insulating block 2211 in its axial direction. The insulating block 2211 is temporarily held at the prescribed position while the output terminal 223 is thrust toward the reference plane 2232 of the mold 2230. In order to thrust the surface toward the reference plane 2232, the inclined surface 2234 of the linear-motion pin 2233A thrusts the back surface of the insulating block 2211, more particularly, the corner between the back surface and the side surface of the insulating block 2211. The insulating block 2211, which is thrust by the inclined surface 2234, is thrust toward the reference plane 2232 with the vertical component of a force that is of the direction perpendicular to its surface. That is, when the linear-motion pin 2233A is thrust into the molding chamber 2231, the corner of the fit attachment portion provided in the insulating block 2211 slides on the inclined surface 2234. Thus, the output terminal 223 is thrust toward the reference plane 2232 of the mold 2230. The inclined surface 2234 of linear-motion pin 2233A has the length that can thrust from the thickest insulating block shown by a solid line of the figure to the thinnest insulating block shown by a dashed line of the figure. The linear-motion pin 2233A elastically thrusts the insulating block 2211 from the both sides, and thus thrusts the output terminal 223 toward the reference plane 2232. The linear-motion pin 2233A is preferably divided into a plurality of upper and lower members. The insulating block 11 is thrust at plurality of upper and lower locations. In this case, the insulating block 2211, which is thrust at the plurality of locations by the linear-motion pin 2233A as mentioned above, is more surely thrust toward the reference plane 2232, and is held at the prescribed position. In order to elastically thrust the insulating block 2211, the linear-motion pin 2233A is externally connected to an elastic body (not shown). The linear-motion pin 2233A is retracted, when the core pack is set on the molding chamber 2231. As a result, the linear-motion pin 2233A does not disturb setting the core pack. In order to retract the linear-motion pin 2233A, the linear-motion pin 2233A is connected to a cylinder, a retractable mechanism, or the like (not shown) through an elastic body externally of the mold 2230. An air cylinder can be used as the cylinder (not shown), and elastically thrusts the linear-motion pin 2233A.

Figure 23:
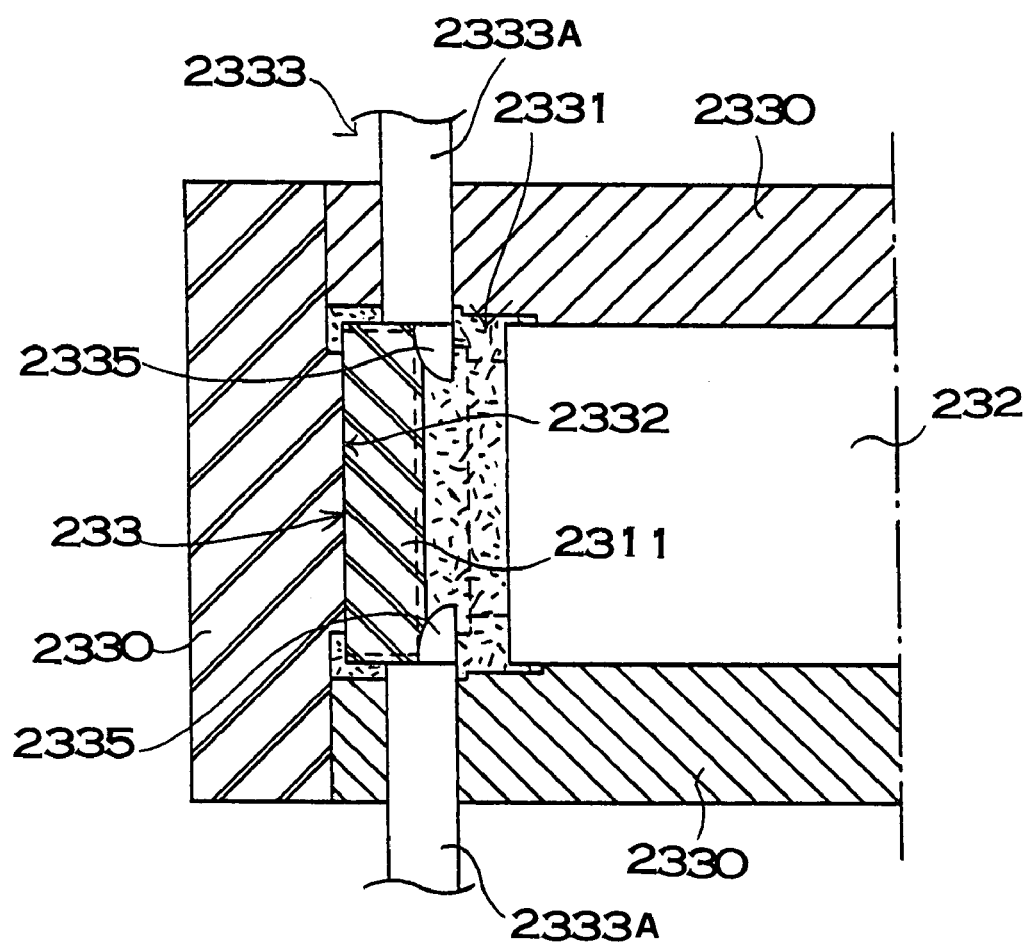
FIG. 23 is a cross-sectional view showing another example of a mold which molds a molded resin portion.

The movable pin 2333 of FIG. 23 is also a linear-motion pin 2333A which protrudes in the molding chamber 2331 toward the insulating block 2311. This linear-motion pin 2333A elastically protrudes in the direction parallel to the front surface of the insulating block 2311 in the molding chamber 2331, and thrusts the insulating block 2311 from the back surface so that an output terminal 233 comes in contact with the reference plane 2332. An angle protrusion 2335 whose the fore edge extends in the direction of the linear-motion is provided on the surface that thrusts the back surface of the insulating block 2311 in this linear-motion pin 2333A. This angle protrusion 2335 thrusts the back surface of the insulating block 2311, and holds the output terminal 233, which is provided on the front surface of the insulating block 2311, on the reference plane 2332. This linear-motion pin 2333A protrudes along the back surface of the insulating block 2311 in parallel to the back surface, and thrusts the back surface of the insulating block 2311 with the angle protrusion 2335. The angle protrusion 2335 thrusts the back surface from the thickest insulating block shown by a solid line of the figure to the thinnest insulating block shown by a dashed line of the figure. Although the angle protrusion 2335 protrudes at the same position of the molding chamber 2331 and thrusts from the thin insulating block to the thick insulating block, the angle protrusion 2335 deeply engages with and thrusts the thick insulating block toward the reference plane 2332, while the angle protrusion 2335 shallowly engages with and thrusts the thin insulating block toward the reference plane 2332. In other words, though the angle protrusion 2335 engages with the back surface of the insulating block 2311, and thrusts it toward the reference plane 2332, the angle protrusion 2335 engages with the thick insulating block and the thin insulating block in different depths. In the movable pin 2333 of this structure, the angle protrusion 2335 engages with the back surface of the insulating block 2311, and can firmly thrust the front surface of output terminal 233 toward the reference plane 2332 and hold it at the prescribed position with a simple structure. This linear-motion pin 2333A is also preferably divided into a plurality of upper and lower members. The insulating block 2311 is thrust at plurality of upper and lower locations. Thus, the output terminal 233 can be more surely thrust toward the reference plane 2332 and held at the prescribed position. This linear-motion pin 2333A is also retracted by a mechanism similar to the linear-motion pin with the inclined surface, when the core pack is set on the molding chamber 2331. As a result, the linear-motion pin does not disturb setting the core pack.

Figure 24:
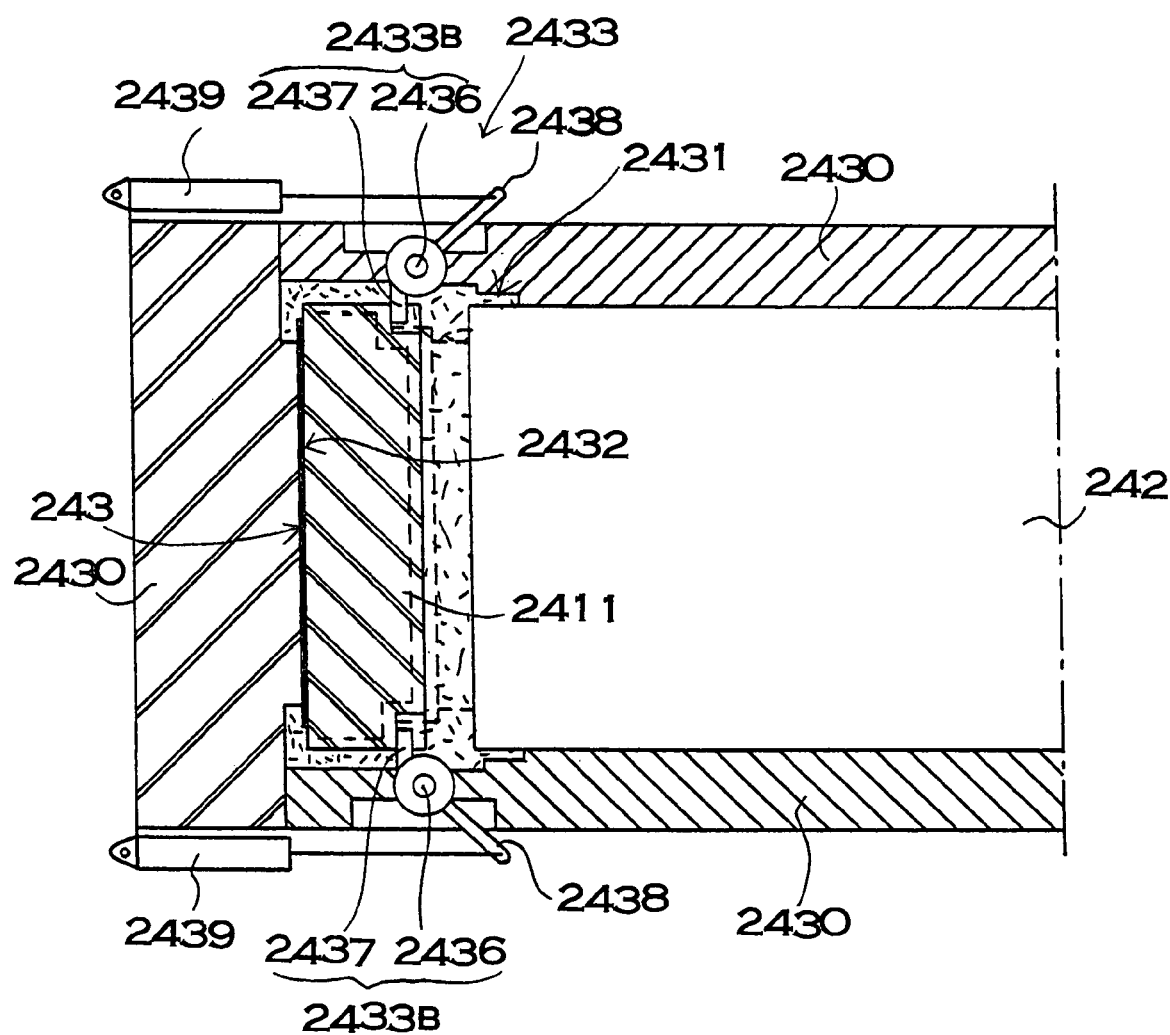
FIG. 24 is a cross-sectional view showing another example of a mold which molds a molded resin portion.

The movable pin 2433 of FIG. 24 is a pivot pin 2433B, which protrudes from the interior surface of the molding chamber 2431 and pivots in the direction that thrusts the back surface of the insulating block 2411 toward the reference plane 2432. This pivot pin 2433B thrusts the back surface of the insulating block 2411, and thrusts the output terminal 243 on the front surface of the insulating block 2411 toward the reference plane 2432, and holds it at the prescribed position. The pivot pin 2433B includes a pivot axis 2436, which is pivotably connected to the mold 2430, and a thrust pin 2437, which is fastened so as to extend outwardly from the center of this pivot axis 2436. A drive arm 2438 protrudes externally of the mold 2430 so that the pivot pin 2433B can be pivoted by actuation applied externally from the mold 2430. One end of the drive arm 2438 is connected to the pivot axis 2436, and another end is connected to a cylinder 2439 or the like. The pivot axis 2436 can pivot, but is connected to the mold 2430 so that an interstice does not develop between the interior surface of the molding chamber 2431 and the pivot axis 2436. The reason is that, when the interstice develops between the pivot axis 2436 and the interior surface of the molding chamber 2431, injected molten resin fills such a interstice and forms flash. This pivot pin 2433B is pivoted by the cylinder 2439, and thrusts the back surface of the insulating block 2411 with the thrust pin 2437. With this pivot pin 2433B, the thrust pin 2437 pivots toward the inside of the molding chamber 2431 so as not to disturb setting the core pack on the molding chamber 2431. After the core pack is set on the molding chamber 2431, the cylinder 2439 pivots the pivot pin 2433B. The thrust pin 2437 thrusts the back surface of the insulating block 2411, and thrust the front surface of the insulating block 2411 toward the reference plane 2432. Thus, the insulating block 2411 is held at the prescribed position.

Figure 25:
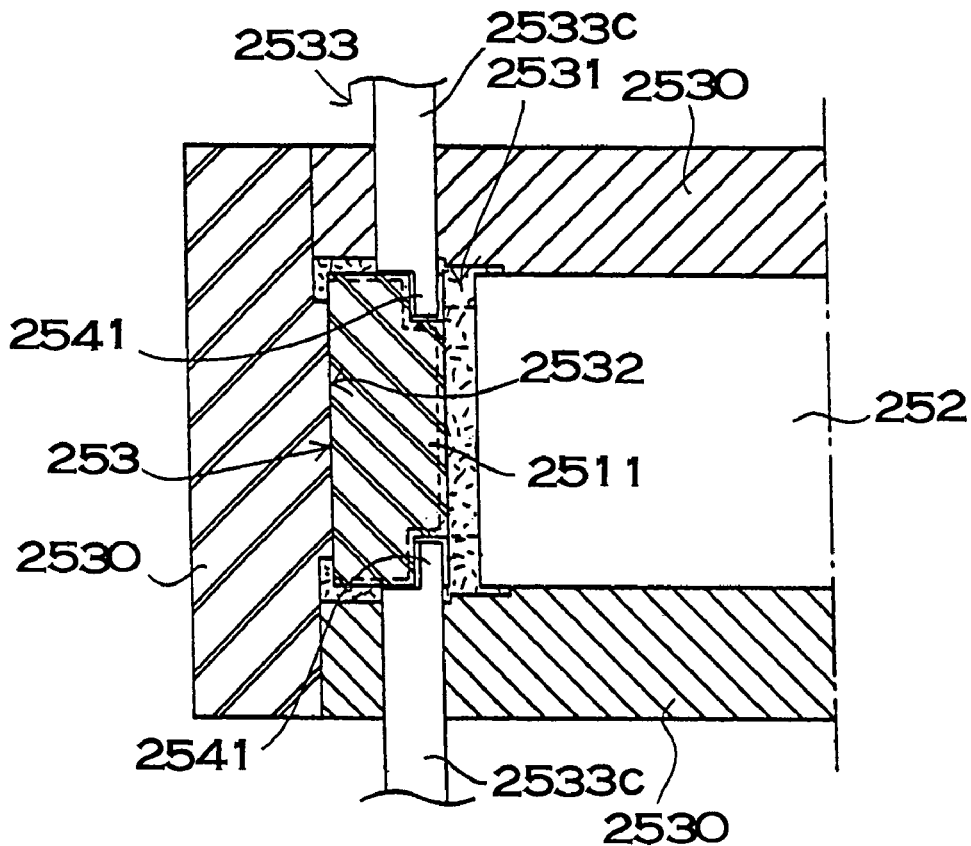
FIG. 25 is a cross-sectional view showing another example of a mold which molds a molded resin portion.
Figure 26:
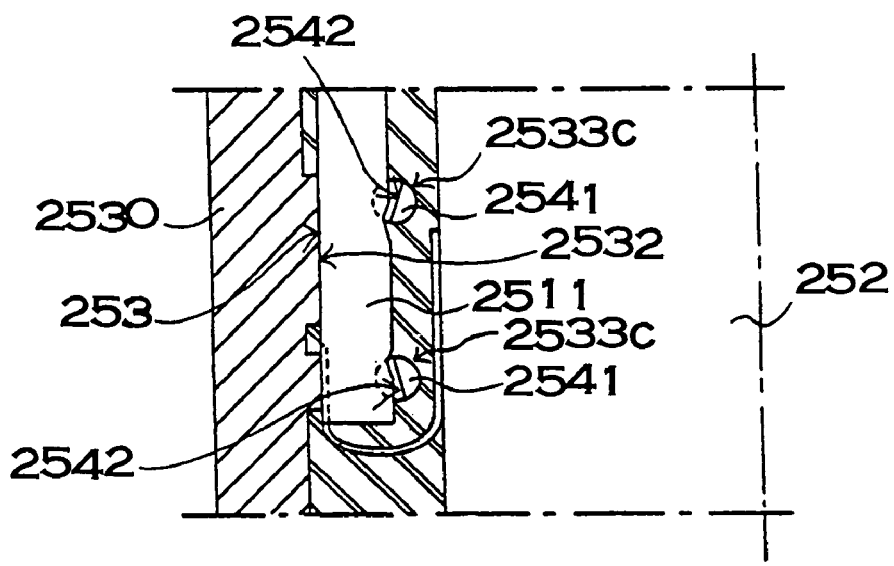
FIG. 26 is a horizontal cross-sectional view of the mold shown in FIG. 25.

The movable pin 2533 of FIGS. 25 and 26 is a cam pin 2533C with a cam surface 2542, which thrusts the back surface of the insulating block 2511, at its fore end. This cam pin 2533C protrudes from the interior surface of the molding chamber 2531, and rotates around the center of the axis while protruding in the molding chamber 2531, and thrusts the front surface of the insulating block 2511 toward the reference plane 2532 with the cam surface 2542. In the cam pin 2533C of the figure, the fore end is cut off in the axial direction so as to form an insertion protruding portion 2541, which is inserted in the back surface of the insulating block 2511. The surface of this insertion protruding portion 2541 opposed to the insulating block 2511 serves as the cam surface 2542. The cam surface 2542 has a shape that can thrust the front surface of the insulating block 2511 toward the reference plane 2532 by rotating the cam pin 2533C around the center axis. The insertion protruding portion 2541 shown in FIG. 26 has a semicircle cross-sectional shape, and a flat cam surface 2542. However, it is not always necessary that the insertion protruding portion 2541 has a semicircle shape. The insertion protruding portion may have any shape that can thrust the insulating block 2511 toward the reference plane 2532 of the mold 2530 with the cam surface 2542 by rotated while being inserted in the back surface of the insulating block 2511. For example, the cam surface of the insertion protruding portion can be a curved surface, thus, the back surface of the insulating block can be smoothly thrust.

The movable pin 2533, which is the cam pin 2533C, protrudes in the direction parallel to both surfaces of the insulating block 2511 in the molding chamber 2531, as shown in FIG. 25, thus, the insertion protruding portion 2541 is inserted into the back surface of the insulating block 2511. The cam pin 2533C thrusts the back surface of the insulating block 2511 with the cam surface 2542 by rotating around of the center axis in the state where the insertion protruding portion 2541 is located on the back surface of the insulating block 2511, as shown in FIG. 26. When the back surface of the insulating block 2511 is thrust, the output terminal 253 on the front surface is thrust toward the reference plane 2532 of the mold 2530, and is temporarily held at the prescribed position. Although the cam pin 2533C of this structure thrusts the insulating block of thickness from thick to thin toward the reference plane 2532 by rotating, the cam pin 2533C rotates at different angles depending upon the thick insulating block or the thin insulating block. That is, in the case of a thick insulating block, the cam pin 2533C thrusts the insulating block toward the reference plane 2532 by rotating at a small angle, while, in the case of a thin insulating block, it thrusts the insulating block toward the reference plane 2532 by rotating at a large angle. Accordingly, the cam surface 2542 has a shape that can thrust the insulating block of from the thickest to the thinnest thickness. This cam pin 2533C is also preferably divided into a plurality of upper and lower members, and thrusts the back surface of the insulating block 2511 with the cam surface 2542 at plurality of locations. Two cam pins 2533C are provided in each of upper and lower parts of the mold 2530 shown in FIGS. 25 and 26, and thrust the back surface of the insulating block 2511 at four locations. A plurality of cam pins 2533C rotate together, and thrust the back surface of the insulating block 2511 at the same time with the cam surfaces 2542. In this case, the cam pins 2533C at the both ends of the insulating block 2511, which are located in right and left locations in FIG. 26, rotate in the directions opposite to each other. The reason is to prevent that the insulating block 2511 is deviated to right or left by being strongly thrust on either right or left side. In the insulating block 2511 whose back surface is thrust at a plurality of locations at the same time as mentioned above, the insulating block 2511 is more surely thrust toward the reference plane 2532, and is held at the prescribed position. These cam pins 2533C are also retracted by a mechanism similar to the foregoing linear-motion pin 2533A in order not to disturb setting the core pack on the molding chamber 2531.

Although not illustrated, the core pack may be provided with a positioning holder between the insulating block and the battery. The positioning holder is produced by molding plastic that is harder than the molded resin portion. This positioning holder is formed in a shape that positions the insulating block at the prescribed position by fitting the insulating block in the positioning holder. The positioning holder can be provided with a positioning fit attachment portion, which is inserted in the molded resin portion so as to be externally exposed. In the battery pack of this structure, the positioning fit attachment portion is provided in the positioning holder of rigid plastic. For this reason, the positioning fit attachment portion is structurally sound, and the battery pack can be accurately positioned in electrical equipment. The positioning fit attachment portion can be formed as a recessed portion. A protruding fit attachment portion provided in the electrical equipment is inserted into this recessed portion, thus, the battery pack is attached to the prescribed position in a predetermined posture. The positioning fit attachment portion may be formed as a protruding portion. The positioning fit attachment portion formed as the protruding portion is fitted in a recessed portion provided in the electrical equipment.

However, with the battery pack where the insulating block 11 of the core pack 10 is inserted and fastened to the molded resin portion 1, since the insulating block 11 is fastened at the accurate position by the molded resin portion 1, as shown in FIG. 4 and FIG. 5, the battery pack is formed in a very simple structure without a positioning holder.

The mold 30, which forms the molded resin portion 1, has the molding chamber 31, which temporarily holds the battery 2 and the insulating block 11 at the accurate positions. The core pack 10 is temporarily held in the molding chamber 31. The core pack 10, which is temporarily held in the molding chamber 31, is held at the accurate position of the molding chamber 31 in the state where the movable pin 33 thrusts the output terminal 3 on the front surface of the insulating block 11 toward the reference plane 32 by thrusting the insulating block 11. In this state, molten resin is injected into the molding chamber 31, and the insulating block 11 is fastened at the accurate position.

The battery 2 can be a rechargeable battery 2, such as a lithium-ion battery, a nickel-hydrogen battery, and a nickel-cadmium battery. The battery 2 of the figure is a thin battery, which has curved surfaces on both sides of an external case 2A, and rounded shapes at four corners of the external case 2A. When a lithium-ion battery is used as the thin battery, there is an advantage that the charge capacity relative to the volume of the whole battery pack can be large. As shown in FIG. 3, a safety valve 25 is provided in this battery 2 on the plane part 2C of the terminal end surface where the protrudent terminal 2B is provided. With the battery 2 shown in the figure, the protrudent terminal 2B is located in the center of plane part 2C, and the safety valve 25 is located at one end. With the battery, the safety valve may be installed in the protrudent terminal. The safety valve 25 opens when the internal pressure of the battery 2 becomes higher than a prescribed pressure. The opening safety valve 25 exhausts internal gas or the like, and stops the rise in the internal pressure of the external case 2A.

Figure 27:
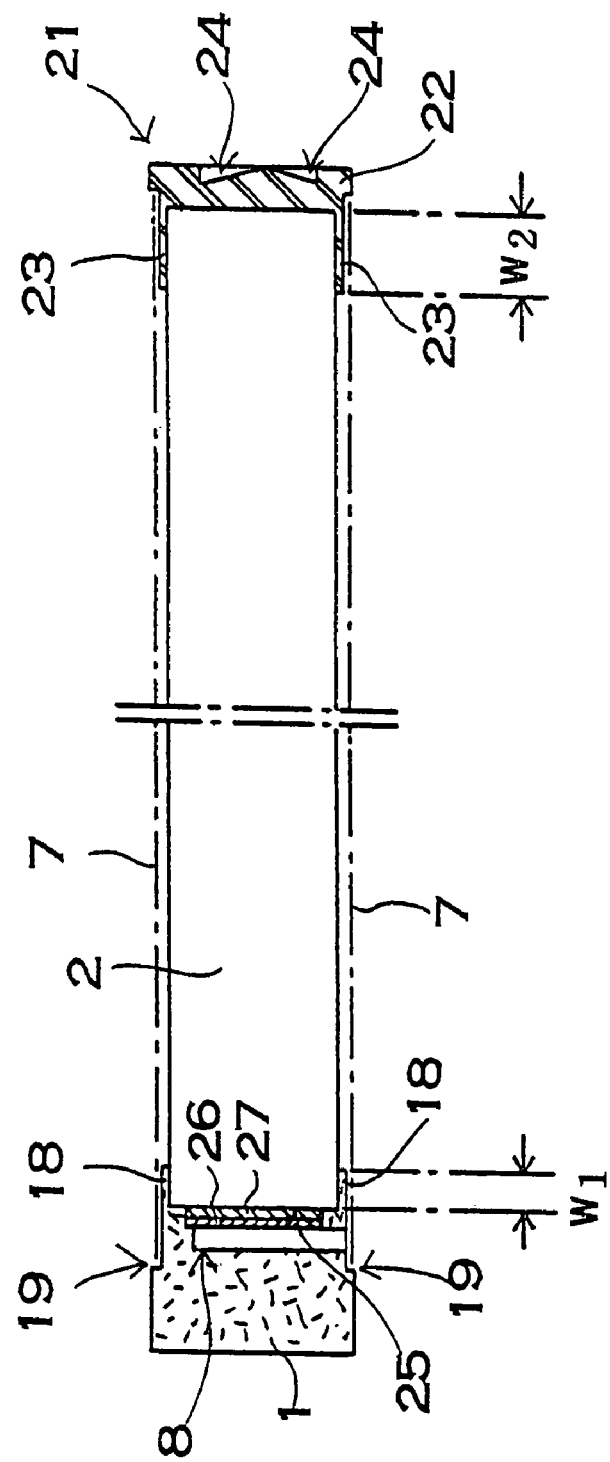

In the core pack 10, as shown in FIG. 3, a protection sheet 26 is attached to an opening of the safety valve 25. The protection sheet 26 is attached onto the plane part 2C of the battery end surface through a double-faced adhesive tape 27. Although not illustrated, the protection sheet 26 is slightly smaller than the perimeter of the plane part 2C. The protection sheet 26 prevents an adverse influence on the safety valve 25 due to injection pressure, when the molded resin portion 1 is molded. A double faced adhesive tape 27, which has a thickness sufficient to absorb irregularities in an adhesion part, is used as the double faced adhesive tape 27, which attaches the protection sheet 26 onto the plane part 2C of the battery end surface. This double faced adhesive tape 27 is in intimate contact with the battery end surface, and can surely attaches the protection sheet 26, in addition, serves to protect the safety valve 25. An exhaust path 8, which externally exhausts the gas in the safety valve 25 when the safety valve 25 opens, is provided in the molded resin portion 1 by molding. As shown in FIG. 27, the exhaust path 8 is formed in a shape that connects the opening of the safety valve 25 externally of the molded resin portion 1. The battery pack of this structure smoothly exhausts the gas, when the safety valve 25 opens. When the safety valve 25 opens, the protection sheet 26 peels off, or the gas through the protection sheet 26, thus, the gas is exhausted.

The insulating block 11 and the battery 2 are provided with primer layers on the adhesion surfaces attached to the molded resin portion 1, and thus are firmly fastened to the molded resin portion 1. When the molded resin portion 1 is molded, the primer layer firmly fastens the molded resin portion 1. Particularly, the primer layer firmly fastens the molded resin portion 1 onto the battery front surface of a metal case. The primer layer may be applied on the insulating block 11, thus, the molded resin portion 1 can be firmly fastened onto this applied region. The primer layer is applied to the surface where the molded resin portion 1 is fastened. With the battery pack of the figure, the molded resin portion 1 is fastened onto the battery end surface. Accordingly, the primer layer is provided on the battery end surface. The molded resin portion 1 is fastened also onto the insulating block 11, and the primer layer is provided also on these surfaces. The primer layer can be applied by spraying a primer liquid, which is a liquid before setting, in a mist, by applying this with a brush, or by immersing the core pack 10 in the primer liquid. The primer layer can be provided on a required part portion in the state of the core pack 10. In other case, the primer layer can be provided on the surface of the battery 2, in addition, on the insulating block 11 before they are assembled as the core pack 10. The primer layer provided on the surface of the insulating block 11 is applied on parts except electric contacts, such as the output terminals 3. The reason is that the primer layer may cause poor contact of electric contacts. Since even the primer layer with a thin thickness has sufficient effect, its thickness can be about 1 µm. However, the primer layer may have a thickness of 0.5 to 5 µm. The primer layer serves to protect the battery surface, additionally to achieve firm attachment of the molded resin portion 1, thus, the primer layer with a large thickness can further improve a protection effect.

The molded resin portion 1 can be formed of polyamide resin. A primer of an epoxy resin group can be used as the primer layer. Polyamide resin in the molded resin portion 1 is chemically bonded to the primer layer by introducing the epoxy group in the primer layer into the acid-amide bond, which exists in the resin. Thus, the molded resin portion 1 is more firmly fastened onto the primer layer. A modified epoxy resin group primer, a phenol resin group primer, a modified-phenol-resin group primer, a polyvinyl butyral group primer, a polyvinyl formal group primer, or the like can be used as the primer, which forms the primer layer, instead of or additionally to the epoxy resin. A mixture of two or more of these primers can also be used. These primers are bonded to a metal surface by hydrogen bond or chemical bond, additionally to bonded to the molded resin portion 1 of the polyamide resin by chemical bond, thus, the molded resin portion 1 is firmly fastened onto the battery surface.

Synthetic resin, which forms the molded resin portion 1, is polyamide resin. Epoxy resin can be added to the polyamide resin. Polyamide resin with epoxy resin added thereto can improve adhesiveness as compared with resin consisting only of polyamide resin. The polyamide resin has low softening temperature, in addition, low viscosity when molten. Accordingly, polyamide resin can be molded at low temperature and low pressure as compared with other thermoplastic synthetic resin. Furthermore, the polyamide resin has an advantage to be quickly removed from the molding chamber 31 of the mold 30. The molded resin portion 1, which is molded at low temperature and low pressure, has an advantage that can reduce time required for molding, and can reduce an adverse influence on the insulating block 11 due to heat, injection pressure, or the like, when the resin is molded. However, the battery pack of the present invention does not specifically limit resin, which forms the molded resin portion 1, to polyamide resin. For example, resin other than the polyamide resin, such as polyurethane resin may be used. When thermal resistance of the insulating block 11 or the like, which is inserted into the molded resin portion 1, can be improved, thermoplastic resin, such as polyethylene, acrylic, or polypropylene resin, may be used.

The battery pack of the figures has a wrapping thin portion 18, which extends from the battery end surface to the perimeter surface of the battery 2, as shown in FIGS. 2, 3, and 27. This wrapping thin portion 18 is molded integrally with the molded resin portion 1, and is fastened onto the perimeter surface of the battery 2 when the molded resin portion 1 is molded. The molten resin injected into the molding chamber 31 of the mold 30 is injected from the battery end surface to a part where the wrapping thin portion 18 is molded, thus, the wrapping thin portion 18 is molded integrally with the molded resin portion 1. The wrapping thin portion 18 is preferably provided around the whole circumference of the perimeter surface of the battery 2. This molded resin portion 1 is connected to the battery 2 so as to the most hardly peel off in the wrapping thin portion 18 provided around the whole circumference of the perimeter surface. However, the wrapping thin portion may be provided only on the each of wide surfaces in the circumference of the perimeter surface of the thin battery.

When the wrapping thin portion 18 is too thick, the outside dimension of the battery pack becomes large. On the other hand, when too thin, sufficient strength cannot be obtained. Accordingly, the thickness of the wrapping thin portion 18 is preferably 0.1 to 0.3 mm, more preferably 0.1 to 0.2 mm. The wrapping thin portion 18 of thickness within this range almost does not substantially increase the thickness of the whole battery pack, which the thin battery is provided inside. The reason is that this range is absorbed in "expansion amount" in use of the thin battery. The thin battery has the property that its center slightly expands and becomes thicker when the internal pressure rises. The wrapping thin portion 18 of thickness within the foregoing range is thinner than the "expansion amount" of the thin battery. The wrapping thin portion 18 is provided so as to extend from the battery end surface on the perimeter surface. However, this part does not expand. For this reason, when the center of the thin battery expands due to the rise of internal pressure, the thickness of the battery pack in the part where the wrapping thin portion 18 is provided is thinner than the expanded center part. Therefore, the provided wrapping thin portion 18 almost does not substantially increase the thickness of the whole battery pack, which the thin battery is provided inside.

The connection strength between the wrapping thin portion 18 and the battery 2 increases, as the width (W1) of the wrapping thin portion 18 is wider. But, even if the width of the wrapping thin portion 18 is set to narrow to some extent, the molded resin portion 1 can be firmly fastened on the battery end surface. Particularly with the battery pack whose surface is covered with a surface covering sheet 7 as shown in the figure, the wrapping thin portion 18 is not peeled off by being thrust toward the battery surface with the surface covering sheet 7. Accordingly, the wrapping thin portion 18 has narrow width (W1) of 0.1 to 2 mm, preferably 0.2 to 1 mm, for example, 0.5 mm. Even in this case, the molded resin portion 1 can be firmly connected to the battery 2. In the wrapping thin portion 18 with narrow width, the molten synthetic resin is surely injected, and thus can be molded in a prescribed shape.

The surface covering sheet 7 is a heat contraction tube, which can be contracted by being heated. This surface covering sheet 7 comes in intimate contact with the surface of the wrapping thin portion 18 of the molded resin portion 1, and firmly connects the molded resin portion 1 to the battery 2. The battery pack covered with the surface covering sheet 7 can keep out a foreign substance, which peels the wrapping thin portion 18 away from the battery 2. Accordingly, the peel-off of the wrapping thin portion 18 can be prevented. However, a label or adhesive tape may be used as the surface covering sheet 7. A label or adhesive tape as the surface covering sheet 7 is applied on the surface of the molded resin portion 1 and the wrapping thin portion or the surface of the battery 2, and firmly connects the molded resin portion 1 to the battery 2.

In the battery pack of FIGS. 3 and 27, a stair 19 is provided around circumference of the molded resin portion 1. The lower part is covered with the surface covering sheet 7. With this molded resin portion 1, the surface covering sheet 7 does not protrude from the molded resin portion 1. The surface of the molded resin portion 1 and the surface covering sheet 7 lie in the substantially same surface.

In the battery pack shown in FIGS. 2 and 27, the battery end surface opposite to the surface where the molded resin portion 1 is molded, the bottom of the battery 2, is covered with a plastic molded member 21 in the figures. This plastic molded member 21 is formed of plastic harder than the molded resin portion 1. With this plastic molded member 21, a bottom 22, which covers the front surface of the battery end surface, and a second wrapping thin portion 23, which extends from the battery end surface around the circumference surface of the battery 2 are integrally formed. The bottom 22 is formed to be thicker than the second wrapping thin portion 23, and is provided with a holding recessed portion 24 into which users put the fore ends of their nails when the battery pack is detached from the electrical equipment.

The foregoing battery pack is manufactured as follows.

(1) The fore end portion of the drawn-out lead plate 29 is fastened onto the plane part 2C adjacent to the protrudent terminal 2B in the terminal end surface by a spot welding process or the like. After that, as shown in FIG. 6, the drawn-out lead plate 29 is bent in a U-shape so that the insulating block 11 is close to the posture where the insulating block 11 is opposed to the terminal end surface, in other words, the posture where the insulating block 11 is parallel to the terminal end surface.

(2) The core pack 10 is produced by connecting the insulating block 11 to the battery 2. The connection portion 28A of the fastened lead plate 28 connected to the insulating block 11 is fastened to the protrudent terminal 2B of the battery 2 by a spot welding process, or the like. With the core pack 10 whose bottom is connected to the plastic molded member 21, the plastic molded member 21 is adhered and fastened thereto.

(3) The core pack 10 is set on the molding chamber 31 of the mold 30. At this time, in the core pack 10, the movable pin 33 thrusts the insulating block 11, the output terminal 3 of the surface of the insulating block 11 is thrust toward the reference plane 32. The insulating block 11, which is thrust toward the reference plane 32 of the mold 30 by the movable pin 33, is temporarily held at the accurate position in the molding chamber 31. The mold 30 is clamped after setting the core pack 10 on the molding chamber 31. In the clamped mold 30, the molding chamber 31 for molding the molded resin portion 1 is formed.

(4) Injection of heated molten resin into the molding chamber 31 is started, then the molding chamber 31 is filled with the molten resin, thus, the molded resin portion 1 is molded. The molten resin is injected through an injection hole opening in the mold 30.

In the injection process of molten resin, the molten resin can be injected in the state where the movable pin 33 thrusts the insulating block 11 toward the reference plane 32 from start of injection during the whole injection process. However, the molten resin may be injected in the state where the movable pin 33 thrusts the insulating block 11 toward the reference plane 32 at start of injection, after that the movable pin 33 is retracted to the position where the insulating block 11 is not thrust before injection of molten resin is completed. After start of injection in the molded resin portion 1, when molten resin is injected into the molding chamber 31, the insulating block 11 is held at the prescribed position by the injected molten resin. Accordingly, after that, even when the molten resin is injected while the movable pin 33 stops thrusting the insulating block 11 toward the reference plane 32, the molten resin can be completely injected with preventing that the insulating block 11 and the second output terminal 3 are deviated from their positions. According to this molding method, since the movable pin 33 is not located at the position where the insulating block 11 is thrust, it is possible to prevent that a sink mark due to the movable pin 33 is produced in the molded resin portion 1.

(5) The mold 30 is opened after setting the molded resin portion 1, then the battery pack in which a part of the core pack 10 is molded in the molded resin portion 1 by insert is picked out.

(6) Subsequently, the battery pack is inserted into the cylindrical surface covering sheet 7 of heat contraction tube, the heat contraction tube comes in intimate contact with the surface of the battery pack by heating the heat contraction tube. The surface covering sheet 7 is in tight intimate contact with the molded resin portion 1 and the plastic molded member, and thus connects firmly the molded resin portion 1 and the plastic molded member 21 to the battery 2.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on applications No. 2003-323771 filed in Japan on Sep. 16, 2003, the content of which is incorporated hereinto by reference.

What is claimed is:

1. A battery pack comprising:
a battery;
a molded resin portion which holds at least a part of the battery;
an insulating block which is provided with a breaker mechanism for cutting-off current flow upon detection of an over-current flow, the insulating block being held by being inserted in the molded resin portion;
an externally exposed output terminal connected to a surface of the insulating block,
wherein the insulating block holds the output terminal on a surface thereof, and the output terminal held by the insulating block is disposed at a prescribed position so as to be externally exposed from the molded resin portion, and
wherein the insulating block includes a base block and a cover block, which are separately formed of plastic, the cover block being fastened to the base block, and a holding chamber is formed between the cover block and the base block;
a fastening metallic member connected to the output terminal; and
a breaker mechanism provided in the holding chamber, wherein the breaker mechanism includes a movable arm, and the movable arm protrudes externally outside of the cover block, and an externally protruding portion of the movable arm is fastened to the fastening metallic member.

2. The battery pack according to claim 1, wherein the output terminal is fastened onto the surface of the cover block.

3. The battery pack according to claim 1, wherein a recessed portion is provided on a surface of the insulating block, and the recessed portion is filled with the molded resin portion to secure the insulating block to the molded resin portion.

4. The battery pack according to claim 1, further comprising a fastened lead plate connected to a protruding terminal of the battery, the fastened lead plate being provided in the insulating block, and the insulating block is provided with a connection opening which opens upwardly of a connection portion of the fastened lead plate.

5. The battery pack according to claim 1, wherein the insulating block is formed of plastic that will not deform at the temperature of soldering.

6. The battery pack according to claim 1, further comprising a temperature sensor connected to the output terminal, wherein a temperature signal is provided from the output terminal in a state in which the breaker mechanism is opened.

7. The battery pack according to claim 1, wherein a stopper for the movable arm is provided on and protrudes from an interior surface of the holding chamber.

8. A battery pack comprising:
a battery including a terminal;
a molded resin portion which holds a part of or the whole of the battery inserted thereto;
an insulating block which is provided with a breaker mechanism for cutting-off current flow when an over-current flow, the insulating block being held by inserted in the molded resin portion,
an externally exposed output terminal connected to a surface of the insulating block, wherein the output terminal held by the insulating block is held at a prescribed position so as to be externally exposed from the molded resin portion; and
a drawn-out lead plate fastened to the terminal of the battery and fastened to the insulating block,
wherein the drawn-out lead plate protrudes from one end of the insulating block, and an end of the protruded part is connected to the terminal of the battery,
wherein the drawn-out lead plate is provided with a bent portion that is bent in a direction that protrudes from the end face of the terminal at its fore end, and
wherein the drawn-out lead plate is bent in a U-shape, and the insulating block is opposed to a terminal surface which the drawn-out lead plate is fastened to, and the insulating block has an insertion recessed portion into which the bent portion of the drawn-out lead plate is fitted, and the insulating block is positioned at the prescribed position of the end face of the terminal in the state that the bent portion is inserted into the insertion recessed portion.

9. The battery pack according to claim 8, wherein the insulating block includes a base block and a cover block, and the base block and the cover block are formed of a plastic that will not deform at a temperature of reflow soldering.

10. The battery pack according to claim 8, wherein the insulating block includes width adjustment protruding portions which are integrally formed on opposite sides of the insulating block, wherein the outer width defined by outermost parts of the adjustment protruding portions is the same as a thickness of the battery.

11. A battery pack comprising:
a battery;
a molded resin portion which holds a part of or the whole of the battery inserted thereto;
an insulating block which is provided with a breaker mechanism for cutting-off current flow upon detection of an over-current flow, the insulating block being held by being inserted in the molded resin portion; and
externally exposed output terminals secured to a surface of the insulating block, wherein the output terminals held by the insulating block are held at a prescribed position so as to be externally exposed from the molded resin portion; and
an electronic component connected by soldering to adjacent ones of the output terminals, wherein opposing surfaces of the adjacent output terminal define opposing notch portions, and the notch portions are formed in opposing edges surfaces of the adjacent output terminals, and an area between the notch portions is filled with resin.

12. The battery pack according to claim 11, wherein the electronic component is fastened to the back surfaces of the adjacent output terminals by soldering, and an insulating portion for preventing the spread of solder is formed integrally with the insulating block in a periphery of an area where the electronic component is soldered.

13. The battery pack according to claim 11, wherein the insulating block includes width adjustment protruding portions which are integrally formed on opposite sides of the insulating block, wherein the outer width defined by outermost parts of the adjustment protruding portions is the same as a thickness of the battery.

* * * * *